US007035624B2

(12) United States Patent
Maegawa

(10) Patent No.: US 7,035,624 B2

(45) Date of Patent: Apr. 25, 2006

(54) COMMUNICATION METHOD, COMMUNICATION SYSTEM, COMMUNICATION DEVICE, MANAGING DEVICE, RECORDING MEDIUM AND USER INFORMATION MODULE

(75) Inventor: Hirotoshi Maegawa, Tokyo (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 10/182,931

(22) PCT Filed: Dec. 5, 2001

(86) PCT No.: PCT/JP01/10610

§ 371 (c)(1), (2), (4) Date: Oct. 21, 2002

(87) PCT Pub. No.: WO02/46991

PCT Pub. Date: Jun. 13, 2002

(65) Prior Publication Data

US 2003/0119491 A1 Jun. 26, 2003

(30) Foreign Application Priority Data

Dec. 5, 2000 (JP) ............................ 2000-370458

(51) Int. Cl.
*H04M 3/42* (2006.01)
*H04Q 7/20* (2006.01)
*H04B 5/00* (2006.01)

(52) U.S. Cl. ...................... 455/414; 455/413; 455/404; 455/445; 455/456; 455/566; 455/426; 455/412; 455/41

(58) Field of Classification Search ................ 455/412, 455/414, 413, 41, 404, 445, 456, 566, 426
See application file for complete search history.

(56) References Cited

U.S. PATENT DOCUMENTS

| | | | | |
|---|---|---|---|---|
| 6,039,250 | A * | 3/2000 | Ito et al. | 235/380 |
| 6,205,436 | B1 * | 3/2001 | Rosen | 705/65 |
| 6,542,749 | B1 * | 4/2003 | Tanaka et al. | 455/456.1 |
| 6,542,750 | B1 * | 4/2003 | Hendrey et al. | 455/456.1 |

FOREIGN PATENT DOCUMENTS

| | | |
|---|---|---|
| EP | JP09-065386 | 3/1997 |
| JP | 10-154193 | 6/1998 |
| JP | 11-143976 | 5/1999 |
| JP | 2001-216400 | 8/2001 |

* cited by examiner

*Primary Examiner*—Allan Hoosain
(74) *Attorney, Agent, or Firm*—Sonnenschein, Nath & Rosenthal LLP

(57) ABSTRACT

The object is to provide a communication system enabling a server to obtain a grasp of the behavior of users on a communications network even when communication is performed between users on the communications network without going through the server. A communication apparatus $\mathbf{3}_1$ has a user information module containing user attribute information indicating an attribute of a user $\mathbf{4}_1$. When the communication apparatus $\mathbf{3}_1$ communicates with a communication apparatus $\mathbf{3}_3$, the communication apparatus $\mathbf{3}_1$ sends user attribute information of the user $\mathbf{4}_1$ to the communication apparatus $\mathbf{3}_2$ and receives and holds user attribute information of a user $\mathbf{4}_2$ from a communication apparatus $\mathbf{3}_2$, and the communication apparatus $\mathbf{3}_1$ sends said held user attribute information of the user $\mathbf{4}_2$ to a management apparatus 5.

38 Claims, 25 Drawing Sheets

HEADER INFORMATION MODULE 21

```
< ?xml version = "1.0"encoding = "Shift__JIS" ? >
< IDOCTYPE passport SYSTEM "passport.dtd" >
< img src = "default__thumbnall.gif" >
< passport PIN ="2454535" format = standard versinon = 2.0 outlook = bizcard >
< view >
  < ownerview >< img src = "my__view__gif" ></ownerview >
  < ownerview PIN = "maegawa__1579462" >
  < name >    < sumame > Maegawa </SUmame >
              < givenname > Hirotoshi </organizatuion >
              </name >
  < work >    < organization > Sony Corporation </organization >
  < address > < street > 7 - 35, Kitashinagawa 6 - chome,
                Shinagawa - ku, Tokyo </street >
              < zip > 141 - 0001 </zip >
              < country > JAPAN </country >
              </address >
              < phone > 03 - 1234 - 5678 </phone >
              < fax > 03 - 1234 - 5678 </FAX >
              < email > maegawa @ sony.co.jp </email >
              < url > http ://www.sony.co.jp </url >
              < url > http ://www.sony.com </url >
              </work >
   < home >   < phone > 03 - 1234 - 1234 </phone >
              < fax > 03 - 1234 - 1234 </FAX >
              < email > maegawa @ so - net.ne.jp </email >
              < url > http ://www.so - net.ne.jp/maegawa </url >
              </home >
   < profile > < interrest > intellectual property </interest >
              < hobby > invention </hobby >
              < hobby > design </hobby >
              </profile >
   </view >
```

22 VIEW INFORMATION MODULE

FIG.23

```
< property >
< uniqueid  PIN =  "maegawa__6485264"category =  "customers"  >
< account >< check >  < data > 2000/10/1 </data >
                      < issuer > Dei </issuer >
                      < amount  unit =  "yen"  > 1,000 </amount >
                      < encrypted > jtao5t3s83j...[omission]...jahreo30k3 </encrypted >
                      </check >
           < check >  < data > 2000/11/1 </data >
                      < issuer > Ando </issuer >
                      < amount  unit =  "yen"  > 2,000 </amount >
                      < encrypted > dk3490aj3...[omission]...d83kds63kj </encrypted >
                      </check >
           < receipt > < data > 2000/11/15 </data >
                      < issuer > Sato </issuer >
                      < amount  unit =  "yen"  > 30,000 </amount >
                      < encrypted > 3oifdker19...[omission]...jeid391311ge </encrypted >
           </receipt >
</property >
```

23 PROPERTY INFORMATION MODULE

FIG.24

```
<association>
    <from content = "view" >
        <view>
            <ownerview><imag src = "idel__view.gif></ownerview>
            <ownersid PIN = "idel__4567892" >
            [view and rest of structure received from other user same
            as above]]
            <view>
        <view>
            <ownerview><imag src = "auto__view.gif></ownerview>
            <ownersid PIN = "auto__5579456" >
            [view and rest of structure received from other user may be
            selected one such as owner view, name, phone, etc.]
            <view>
        <view>
            <ownerview><imag src = "suzuki__view.gif></ownerview>
            <ownersid PIN = "suzuki__4578245" >
            <home>  <phone>03 - 1234 - 5555</phone></home>
            <view>
        </from>
```

24 ASSOCIATION INFORMATION MODULE

FIG.25

```
< to content = "view" >
    < view >
            [view and structure of other user same as above.
            preferably same abbreviated form selected as above by
            other party to whom own view is sent]
        < view >
    < uniqueid PIN = "idel__5791213"category = "customers" > [Enough only id]
    < uniqueid PIN = "auto__4697219"category = "customers" >
    < uniqueid PIN = "sato__6648214"category = "providers" >
    < uniqueid PIN = "suzuki__8722859"category = "customers" >
    </to >
< from content = "voucher" >
    < uniqueid PIN = "idel__5791213"category = "customers" >
    < uniqueid PIN = "auto__4697219"category = "customers" >
    < uniqueid PIN = "sato__6648214"category = "providers" >
    </form >
< to content = "voucher" >
    < uniqueid PIN = "idel__5791213"category = "customers" >
    < uniqueid PIN = "auto__4697219"category = "customers" >
    < uniqueid PIN = "sato__6648214"category = "providers" >
    </to >
 </association >
```

24 ASSOCIATION INFORMATION MODULE

COMMUNICATION METHOD, COMMUNICATION SYSTEM, COMMUNICATION DEVICE, MANAGING DEVICE, RECORDING MEDIUM AND USER INFORMATION MODULE

BACKGROUND OF THE INVENTION

The present invention relates to a communication method capable of managing attributes of communication between communication apparatuses, a communication system, communication apparatus, management apparatus, storage medium, and user information module.

For example, when providing a variety of services to users via a communications network such as the Internet, the users are charged in accordance with the service content and a variety of information is given, so a function for identifying users who utilize the services is necessary.

Most information services on the Internet are of a client/server system wherein a terminal of a user accesses a specific server to obtain the services. The WWW (World Wide Web) is a typical system of the same. Further, the case of users being introduced to service providers by a so-called portal site and connecting from a terminal to a server by following the information can also be referred to as a client/server system. In a client/server system as above, a user has to connect his terminal to a server via a network and register when starting to utilize the service or when purchasing goods. After that, the user may use the user ID information or an e-mail address issued at the time of the user registration to receive the service. On the other hand, the server can identify users registered on the Internet and obtain a grasp of the trends in use of the users.

In a system combined with mobile phones etc., user identification is possible because information of the telephone subscribers can be automatically obtained by usage of telephone lines.

However, the type of information services using the Internet in recent years is not limited to a case where terminals of users are connected to servers. Namely, terminals of users are increasingly directly connecting with each other to exchange information. In this case, when the information to be exchanged is something provided by specific information service providers, that specific information is exchanged without the awareness of the service providers. Accordingly, it becomes difficult for the service provider side to accurately obtain a grasp of the trends of service provision. The exchanged information includes indirect information relating to transactions of goods etc. besides direct information such as mutually exchanged data itself.

Also, in the case of an information community providing communication means between users even for services provided on a server, information is directly exchanged between the users and sometimes it is not easy for the server to obtain a grasp of the content of the information exchange. While the above described the case of obtaining a grasp of the state of use of individual users, it is also difficult for the server to determine the trends in collective use of information by users.

SUMMARY OF THE INVENTION

The present invention was made in consideration of the above problems and has as an object thereof to provide a communication method enabling a server to obtain a grasp of trends in use of users on a communications network even when users communicate via the communications network without going through the server and a communication system, communication apparatus, management apparatus, storage medium, and user information module for the same.

To solve the above problems of the prior art and to attain the above object, a communication method according to a first aspect of the present invention is a communication method wherein a plurality of communication apparatuses and a management apparatus communicate via a communications network, comprising the steps of: holding by the communication apparatus a user information module including user attribute information indicating an attribute of a user of the communication apparatus; sending by the communication apparatus the user attribute information of the user of that communication apparatus to other of the communication apparatus, receiving and holding by the communication apparatus the user attribute information of a user of the other communication apparatus from the other communication apparatus when any of the communication apparatus; and sending by any of the communication apparatus the user attribute information of the user of the other communication apparatus to the management apparatus.

As explained above, in the communication method of the first aspect of the present invention, when any of the communication apparatuses communicates with another communication apparatus, the user attribute information of user of the other communication apparatus is received and held from the other communication apparatus and sent to a management apparatus. Therefore, the management apparatus can easily obtain information for obtaining a grasp of the behavior of users on the communications network.

Further, in the communication method of the first aspect of the invention, preferably the user attribute information contains at least identification information of the user information module of a corresponding user.

Further, in the communication method of the first aspect of the invention, preferably any of the communication apparatus stores the user attribute information received from the other communication apparatus in the user information module of the user of the communication apparatus. Further, in the communication method of the first aspect of the invention, preferably the management apparatus obtains an attribute of communication performed via the communications network based on the user attribute information received from any of the communication apparatus. Further, in the communication method of the first aspect of the invention, preferably the attribute of communication is the contents of a transaction performed between users of a plurality of communication apparatuses linked by communication via the communications network. Alternatively, in the communication method of the first aspect of the invention, preferably the attribute of communication is a group formed by users of a plurality of the communication apparatuses linked by communication via the communications network. The management apparatus figures out trends of the users based on the attribute of communication.

Further, in the communication method of the first aspect of the invention, when the user of that any communication apparatus and the user of the other communication apparatus communicate concerning a transaction, any of the communication apparatus stores transaction contents information indicating the contents of the transaction in the user information module and sends the transaction contents information to the management apparatus. Preferably, the management apparatus performs processing concerning settlement based on the transaction contents information.

Further, in the communication method of the first aspect of the present invention, preferably the user information module contains: the user attribute information, user identification information, transaction contents information indicating the contents of a transaction by the communication performed with the other user, and the user attribute information of the user of the other communication apparatus communicated with.

Further, in the communication method of the first aspect of the present invention, preferably the user information module identification information is issued by the user or the management apparatus.

Further, in the communication method of the first aspect of the present invention, preferably the user attribute information further contains: image information on the user and profile information of the user.

Further, in the communication method of the first aspect of the present invention, preferably at least a part of the information stored in the user information module is encoded by public key information of the management apparatus; and the management apparatus decodes the encoded information by using secret key information corresponding to the public key information.

Further, in the communication method of the first aspect of the present invention, preferably when a first user provides a service from a first communication apparatus to a second communication apparatus of a second user via the communications network, electronic money information or voucher information is transferred between the first communication apparatus and the second communication apparatus via the communications network to have the first user pay for the service to the second user. Further, the first communication apparatus stores the user attribute information received from the second communication apparatus in the user information module of the first user.

A communication system of a second aspect of the present invention is a communication system where a plurality of communication apparatuses and a management apparatus communicate via a communications network, wherein the communication apparatus holds a user information module containing user attribute information indicating an attribute of a user of the communication apparatus, any of the communication apparatus communicating with another communication apparatus sends the user attribute information of the user of the communication apparatus to the other communication apparatus and holds by receiving the user attribute information of the user of the other communication apparatus from the other communication apparatus, and any of the communication apparatus sends the held user attribute information of the user of the other communication apparatus to the management apparatus.

A communication apparatus of a third aspect of the present invention is a communication apparatus for communicating with other communication apparatuses and a management apparatus via a communications network comprising: a storage means; a communication interface; and a control means, wherein the storage means storing a user information module containing user attribute information indicating an attribute of a user of the communication apparatus the communication interface, when communicating with another communication apparatus based on control from the control means, sending the user attribute information to the other communication apparatus and receiving the user attribute information of a user of the other communication apparatus from the other communication apparatus, the control means writing the received user attribute information in the storage means, and the communication interface sending the received user attribute information which the control means read from the storage means.

A management apparatus of a fourth aspect of the present invention is a management apparatus managing communication performed by a plurality of communication apparatuses through a communications network, comprising: a communication interface for receiving, from a communication apparatus, user attribute information indicating an attribute of a user of another communication apparatus obtained by the communication apparatus by communication between the communication apparatus and the other communication apparatus; a storage means for storing the received user attribute information; and a processing means for managing an attribute of communication performed between the plurality of communication apparatuses based on the user attribute information stored in the storage means.

A storage medium of a fifth aspect of the present invention is a storage medium storing a user information module used by a communication apparatus communicating with another communication apparatus via a communications network, wherein the user information module includes: identification information for identifying the user information module; attribute information indicating an attribute of a user; identification information for identifying a user; transaction content information indicating a content of a transaction performed with a user of the other communication apparatus; and user attribute information of a user of the other communication apparatus communicated with.

A user information module of a sixth aspect of the present invention is a user information module used by a communication apparatus communicating with another communication apparatus via a communications network which includes: identification information for identifying the user information module, attribute information indicating an attribute of a user, identification information for indicating a user, transaction content information indicating a content of a transaction performed with a user of the other communication apparatus, and the user attribute information of the user of the other communication apparatus communicated with.

BRIEF DESCRIPTION OF DRAWINGS

FIG. 22 is a view for explaining an example of writing a cyber passport information module SPIM by XML.

FIG. 23 is a view for explaining an example of writing a cyber passport information module SPIM by XML.

FIG. 24 is a view for explaining an example of writing a cyber passport information module SPIM by XML.

FIG. 25 is a view for explaining an example of writing a cyber passport information module SPIM by XML.

DETAILED DESCRIPTION OF THE PRESENTLY PREFERRED EMBODIMENTS

Below, a preferred embodiment of the present invention will be explained with reference to the drawings.

Figure 1:
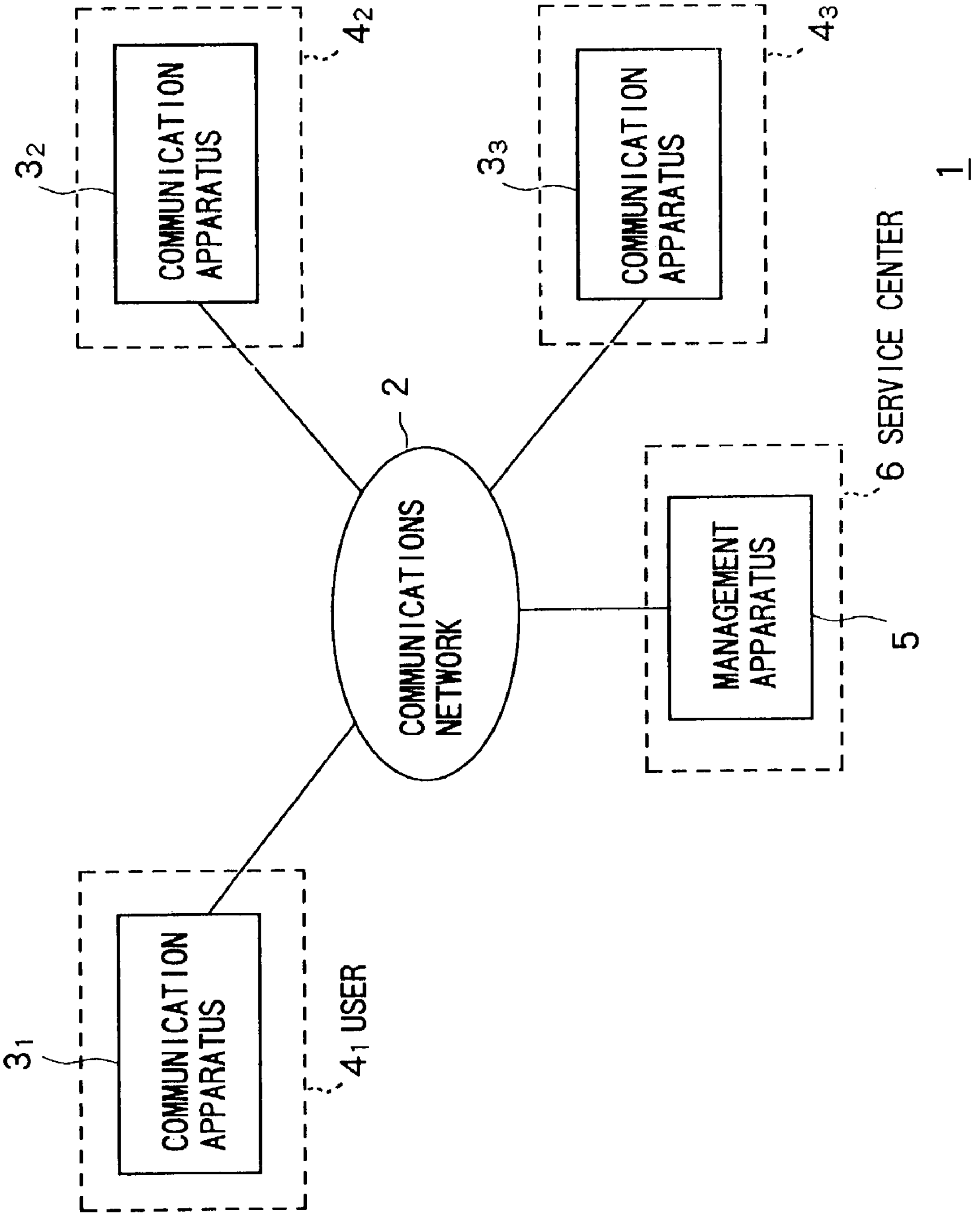
FIG. 1 is a view of the overall configuration of a communication system of an embodiment of the present invention.

FIG. 1 is a view of the overall configuration of a communication system 1 of the present embodiment.

As shown in FIG. 1, a communication system 1 is comprised of communication apparatuses $\mathbf{3}_1$, $\mathbf{3}_2$, and $\mathbf{3}_3$ and a management apparatus 5 connected via a communications network 2. The communication apparatuses $\mathbf{3}_1$ to $\mathbf{3}_3$ are used by users $\mathbf{4}_1$ to $\mathbf{4}_3$, hold later explained cyber passport information modules $SPIM_1$ to $SPIM_3$ corresponding to the users 4, and communicate information using the same. The communications network 2 is not particularly limited, but may be for example a public telephone network, wireless communication by infrared rays, etc.

In FIG. 1, the communication system 1 corresponds to the communication system of the present invention, the communications network 2 corresponds to the communications network of the present invention, the communication apparatuses $\mathbf{3}_1$, $\mathbf{3}_2$ and $\mathbf{3}_3$ correspond to communication apparatuses of the present invention, and the management apparatus 5 corresponds to the management apparatus of the present invention. Also, the cyber passport information module SPIM corresponds to the user information module of the present invention.

Below, the cyber passport information module $SPIM_1$ will be explained. Note that the cyber passport information modules $SPIM_2$ and $SPIM_3$ basically have the same data configuration of that of the cyber passport information module $SPIM_1$.

Figure 2:
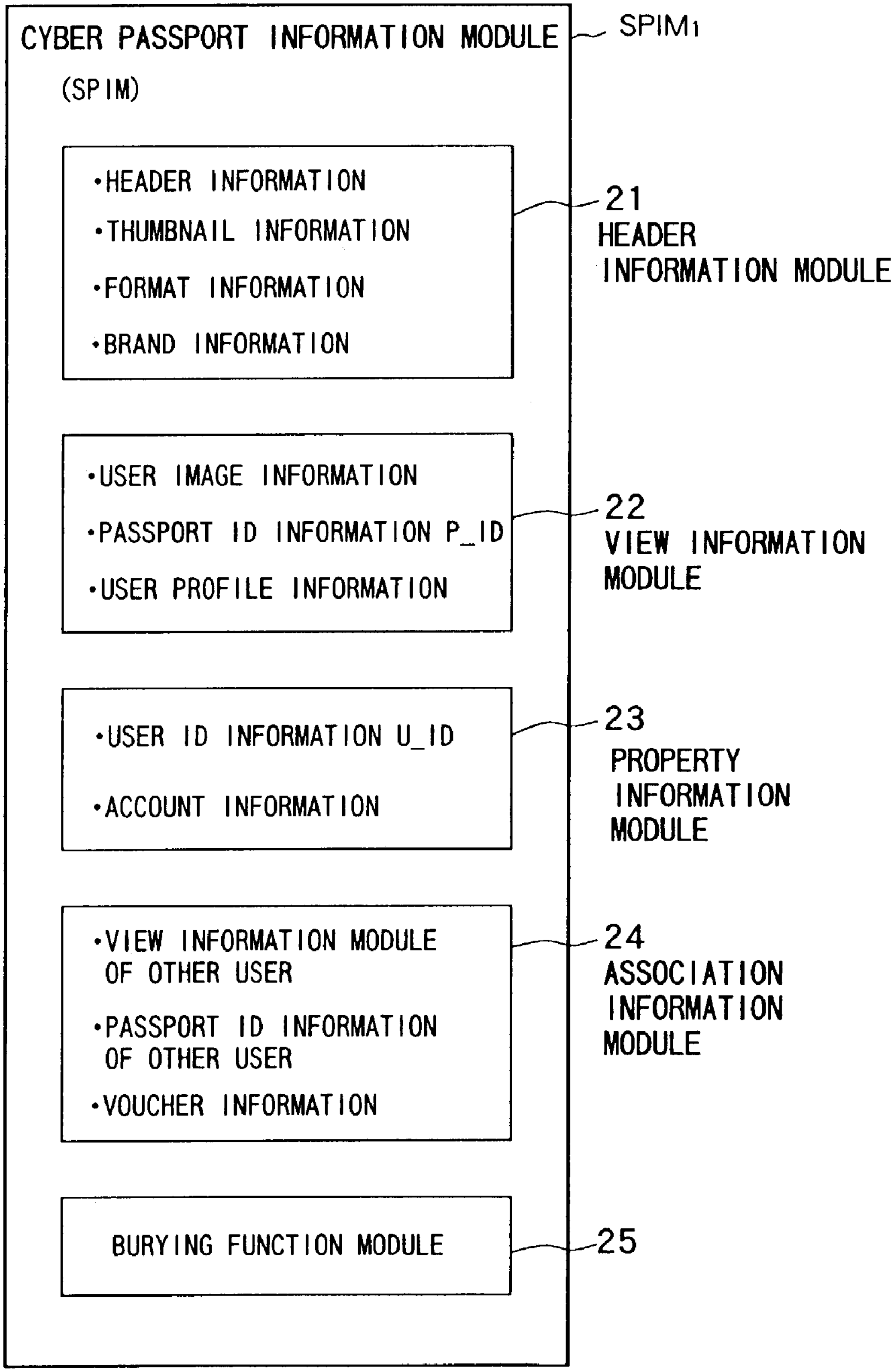
FIG. 2 is a view for explaining a cyber passport information module used in an embodiment of the present invention.

FIG. 2 is a view for explaining the cyber passport information module $SPIM_1$. As shown in FIG. 2, the cyber passport information module $SPIM_1$ stores a header information module 21, a view information module 22, a property information module 23, an association information module 24, and a burying function module 25. Here, the view information module 22 corresponds to attribute information of the present invention.

The header information module 21 is comprised of header information, thumbnail information, format information, and brand information. The header information is information displayed at an early stage. The thumbnail information is information for displaying the fact of being a cyber passport information module SPIM at an early stage. The format information is information indicating the format of the cyber passport information module SPIM used. the brand information is information for displaying a brand mark.

The view information module 22 is comprised of user image information (image information regarding a user of the present invention), passport ID information P_ID (user information module identification information of the present invention), and user profile information (profile information of the user 4 of the present invention). The user image information is image information regarding the user 4 of the cyber passport information module SPIM, for example, image information of the face of the user 4. The user image information is image information simulating an ID card, name card, etc. The passport ID information P_ID is information for identifying the cyber passport information module SPIM. The passport ID information P_ID is issued by the user 4 or the management apparatus 5. The user profile information is basic information on the user 4, for example, the name, address, telephone number, e-mail address, URL, etc. of the user 4. Note that the user profile information may be included in the user image information as a part of the image.

The property information module 23 is comprised of user ID information U_ID (user identification information of the present invention) and account information (transaction content information of the present invention). The user ID information U_ID is issued by the management apparatus 5 and is information for identifying the user 4. The user ID information is encoded for example by public key information of the management apparatus 5. Note that the cyber passport information module SPIM may be used before the issuance of the user ID information U_ID by the management apparatus 5. The account information is information regarding a voucher (private check and receipt) regarding electronic money and electronic business transactions. The account information is encoded for example by public key information of the management apparatus 5.

The association information module 24 is comprised of a view information module 22, a passport ID information P_ID of a user 4 to which the view information module is sent, and a passport ID information P_ID of the other party with whom a voucher information (check information and receipt information etc.) was exchanged by communication. The view information module 22 is sent from a communication apparatus 3 of another user 4 when communicating with the other user 4.

Furthermore, the passport ID information P_ID is obtained as passport ID information P_ID of a user 4 (preferably includes information for enabling identification of another user 4 such as user ID information U_ID and email address of the other user 4) to whom the view information module 22 is sent at the time of communicating with other user 4.

The burying function module 25 is used in the case of incorporating a function of performing processing regarding a cyber passport information module SPIM. The function is, for example, to realize an exchange of the cyber passport information module SPIM between users 4 and access to a management apparatus 5 when using the WWW (World Wide Web) browser as a user interface of the cyber passport.

In the cyber passport information module SPIM, a header information module 21, a view information module 22, a property information module 23, an association information module 24, and a burying function module 25 are defined as lower structures of the header information module 21. Note that in the present invention, for example, the view information module 22 may be incorporated in thumbnail information of the header information module 21 and the view information module 22 may be used in a display at an early stage.

The above described cyber passport information module SPIM is structured and written, for example, by using XML (extensible, Markup Language). In the structure of the cyber passport information module SPIM, JPEG (Joint Photographic Experts Group) or GIF (Graphic Interchange Format) image data may be used as the user image information and information other than that may be stored in a JPEG and GIF additional data region.

[Communication Apparatuses $3_1$, $3_2$, and $3_3$]

Figure 3:
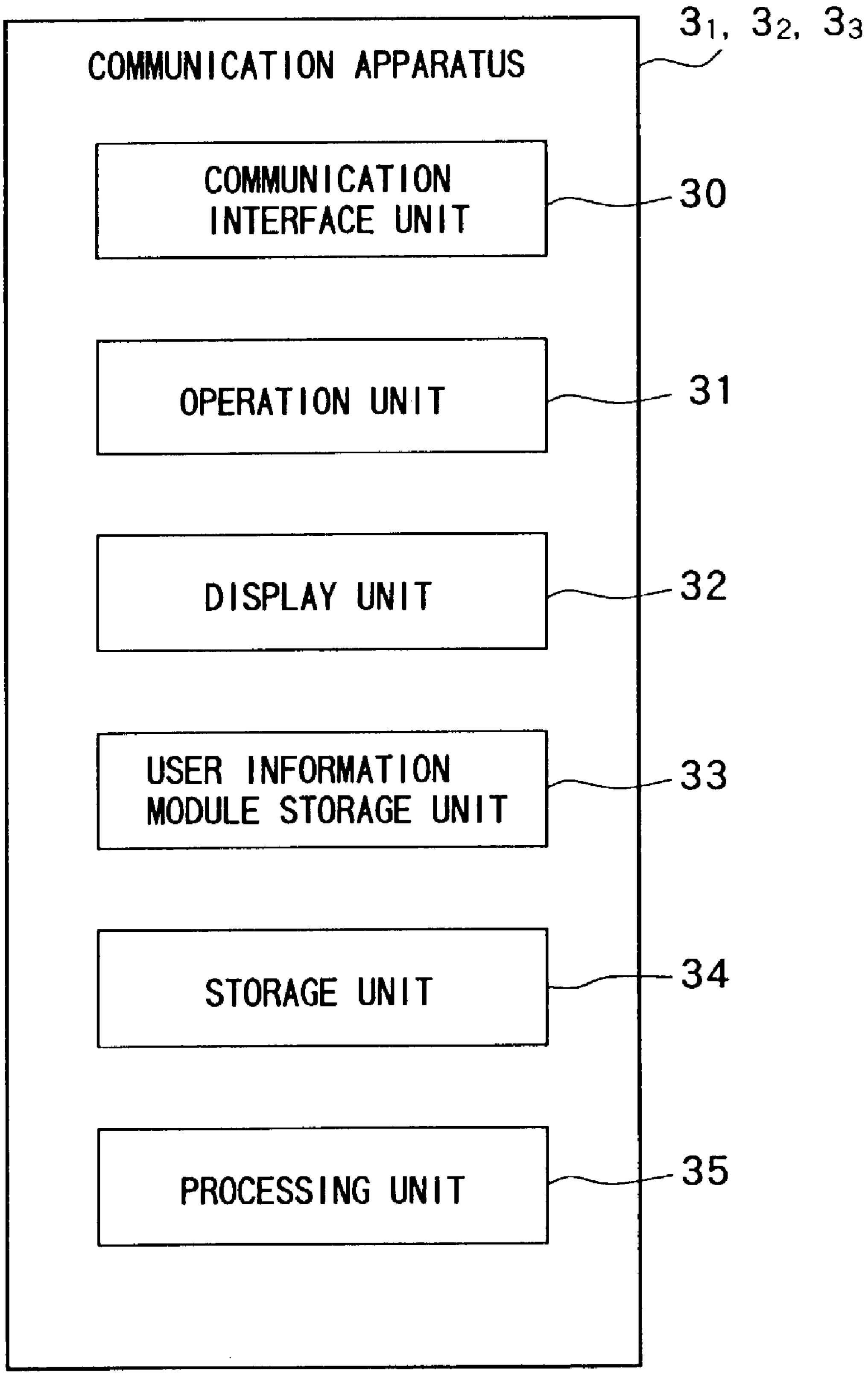
FIG. 3 is a block diagram of functions of a management apparatus shown in FIG. 1.

FIG. 3 is a block diagram of functions of the communication apparatuses $3_1$, $3_2$, and $3_3$.

As shown in FIG. 3, the communication apparatuses $3_1$, $3_2$, and $3_3$ each comprise a communication interface unit 30, an operation unit 31, a display unit 32, a user information module storage unit 33, a storage unit 34, and a processing unit 35. Here, the communication interface unit 30 corresponds to the communication interface of the present invention, the user information module storage unit 33 and the storage unit 34 correspond to the storage means of the present invention, and the processing unit 35 corresponds to the control means of the present invention.

The communication interface unit 30 transfers information with other communication apparatuses and the management apparatus 5 via the communications network 2.

The operation unit 31 is a keyboard, mouse, etc. which outputs an operation signal in accordance with an operation by a user 4 to the processing unit 35. The display unit 32 displays an image in accordance with a display signal from the processing unit 35. The user information module memory 33 stores the cyber passport information module SPIM shown in FIG. 2. The storage unit 34 stores predetermined information and programs to be executed by the processing unit 35.

The processing unit 35, for example, performs later explained processing in accordance with an operation signal from the operation unit 31.

Figure 4:
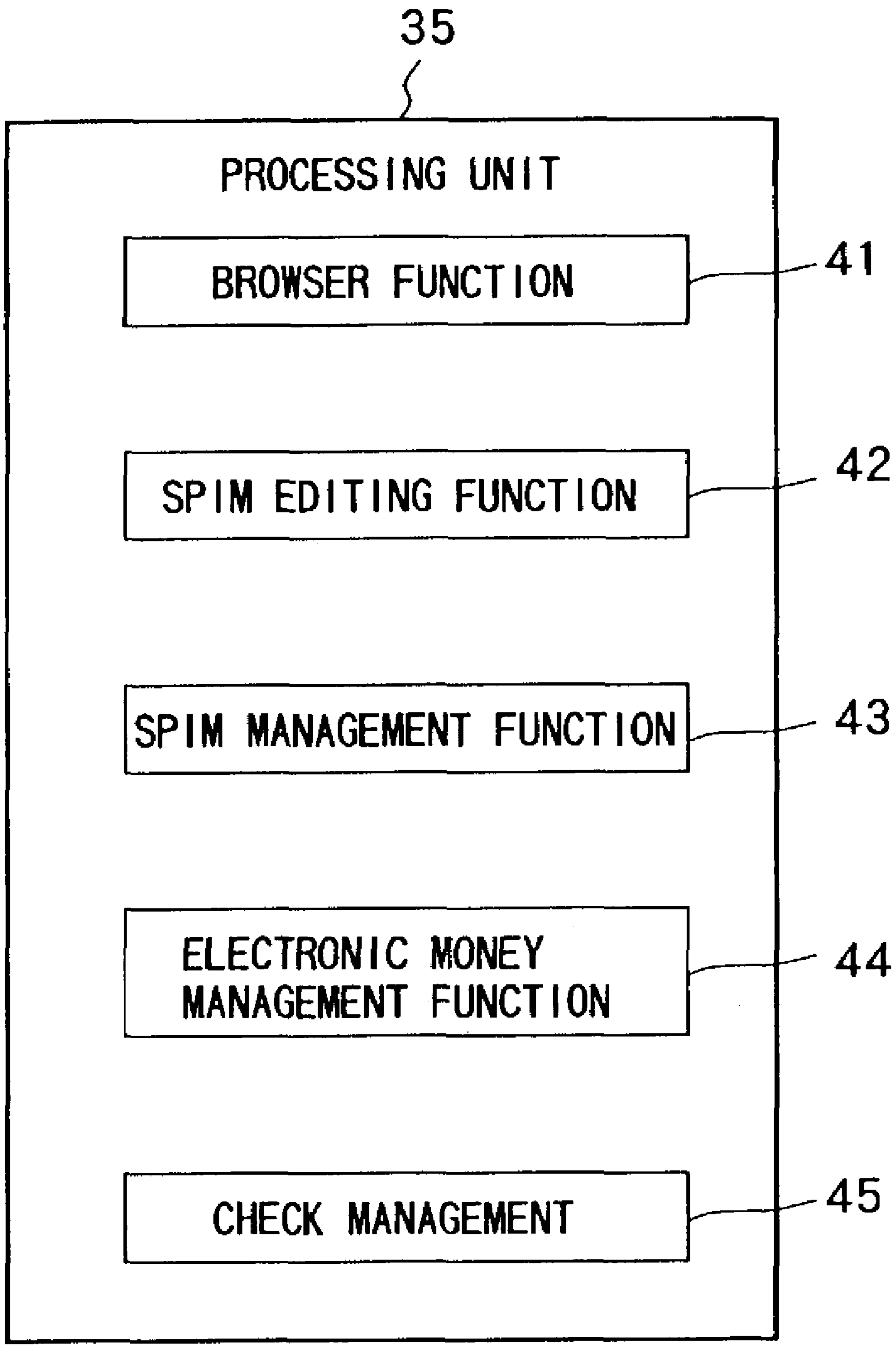
FIG. 4 is a view for explaining functions realized by a processing unit shown in FIG. 3.

FIG. 4 is a view for explaining functions to be realized by the processing unit 35. As shown in FIG. 4, the processing unit 35 executes a program read from the storage unit 34 to realize a browser function module 41, a SPIM editing function module 42, a SPIM management function module 43, an electronic money management function module 44, and a check management module 45.

[Management Apparatus 5]

Figure 5:
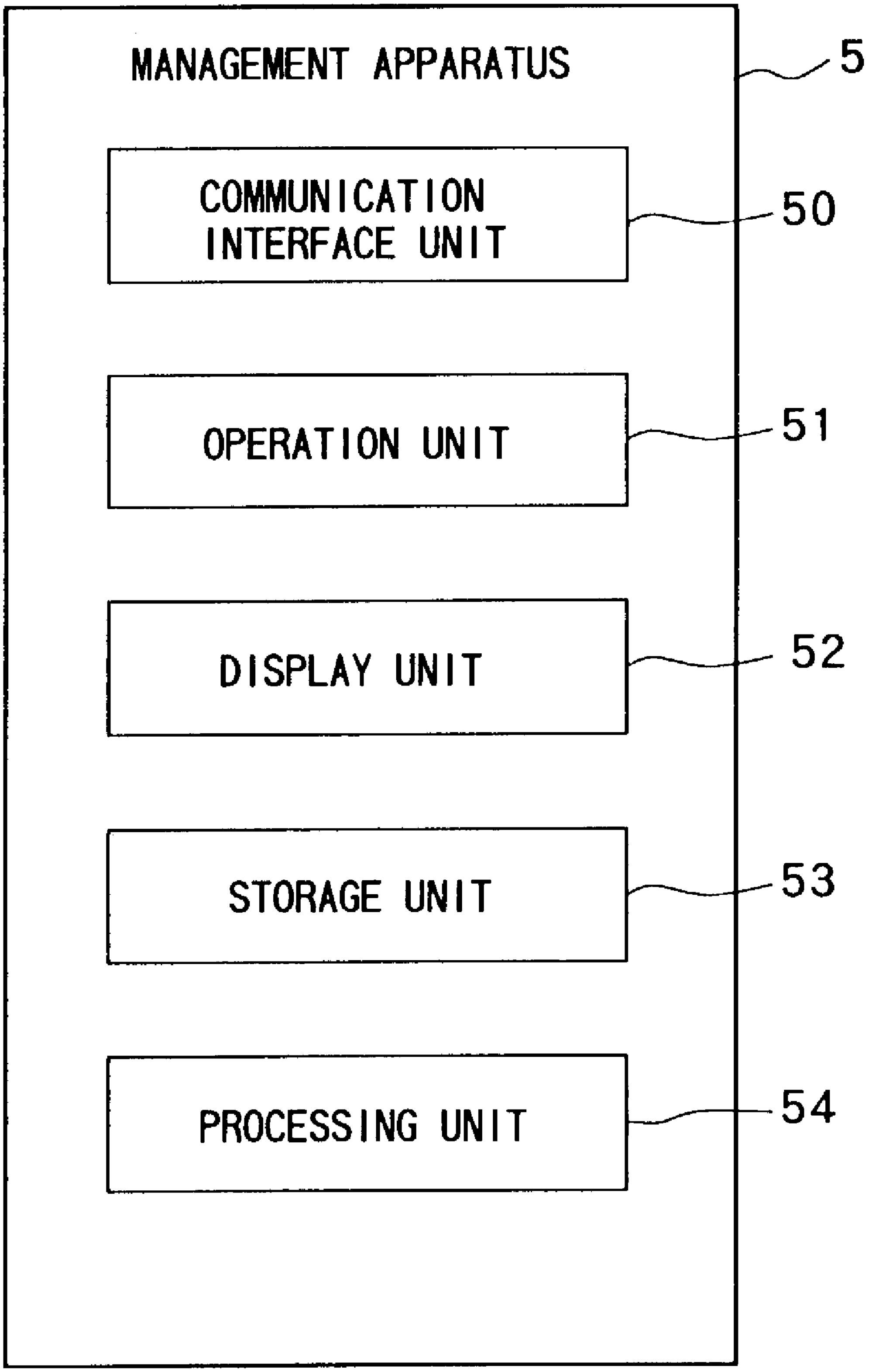
FIG. 5 is a block diagram of functions of a management apparatus shown in FIG. 1.

FIG. 5 is a block diagram of functions of the management apparatus 5.

As shown in FIG. 5, the management apparatus 5 comprises a communication interface unit 50, an operation unit 51, a display unit 52, a storage unit 53, and a processing unit 54. Here, the communication interface unit 50 corresponds to the communication interface of the present invention, the storage unit 53 corresponds to the storage means of the present invention, and the processing unit 54 corresponds to the processing means of the present invention.

The communication interface unit 50 transfers information between communication apparatuses $3_1$, $3_2$, and $3_3$ via the communications network 2. The operation unit 51 is a keyboard, mouse, etc. which outputs an operation signal in accordance with an operation by a manager to the processing unit 54. The display unit 52 displays an image in accordance with a display signal from the processing unit 54. The storage unit 53 stores programs to be executed by the processing unit 54, user management information generated by the processing unit 54, etc.

The processing unit 54, for example, performs later explained processing in accordance with an operation signal from the operation unit 51.

Figure 6:
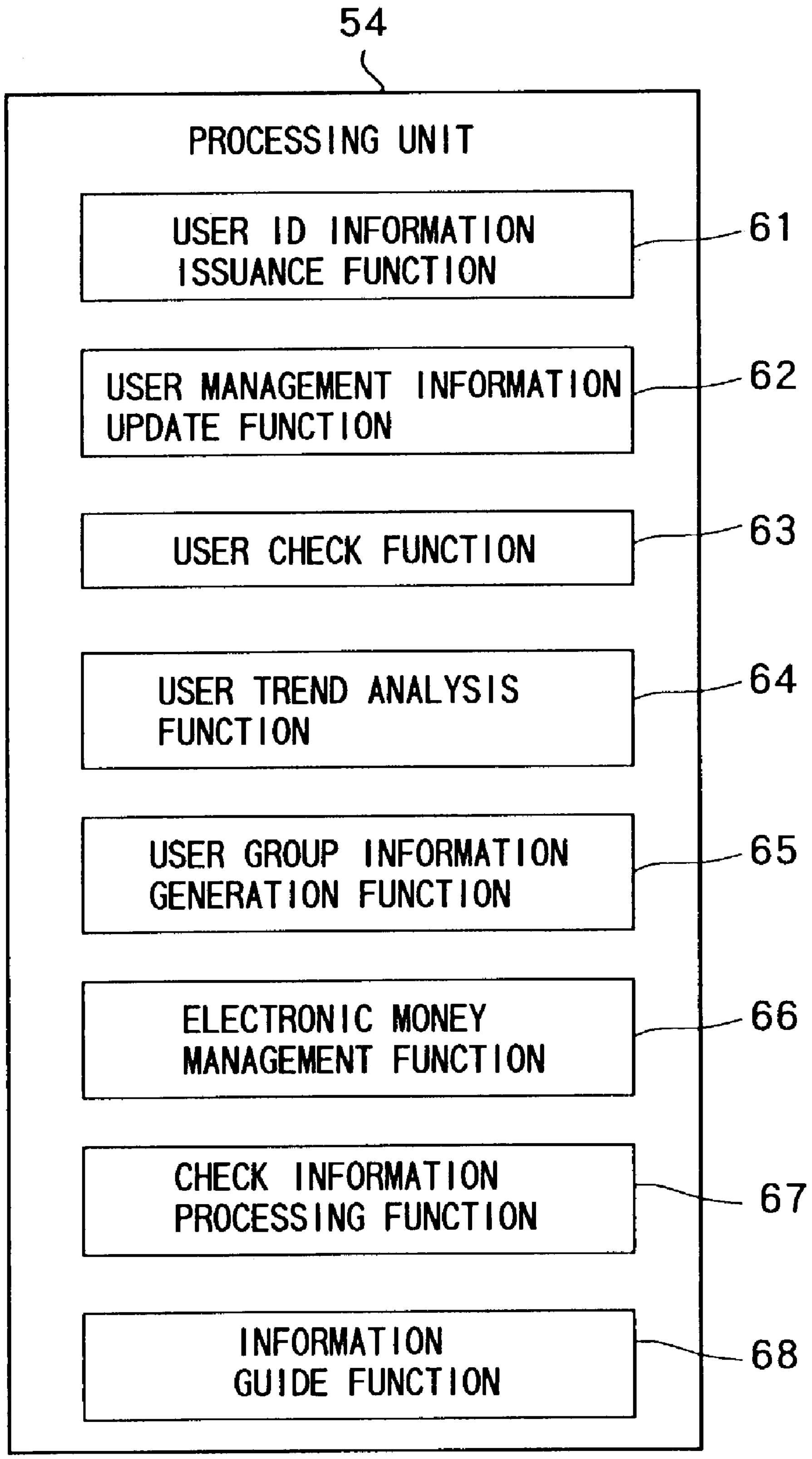
FIG. 6 is a view for explaining functions realized by the processing unit shown in FIG. 5.

FIG. 6 is a view for explaining functions to be realized by the processing unit 54. As shown in FIG. 6, the processing unit 54 executes a program read from the storage unit 53 to realize a user ID information issuance function module 61, a user management information update function module 62, a user query function module 63, a user trend analysis function module 64, a user group information generation function module 65, an electronic money management function module 66, a check information processing module 67, and an information guide function module 68.

Below, an example of the operation of a communication system 1 will be explained with reference to information in the cyber passport information module SPIM in FIG. 2 and function blocks shown in FIG. 3 to FIG. 6.

FIRST EXAMPLE OF OPERATION

In the present example of operation, a case where a user 41 generates a cyber passport information module SPIM will be explained. Note that in the present example of operation, a case where user ID information of the user 41 is not yet issued will be explained.

Figure 7:
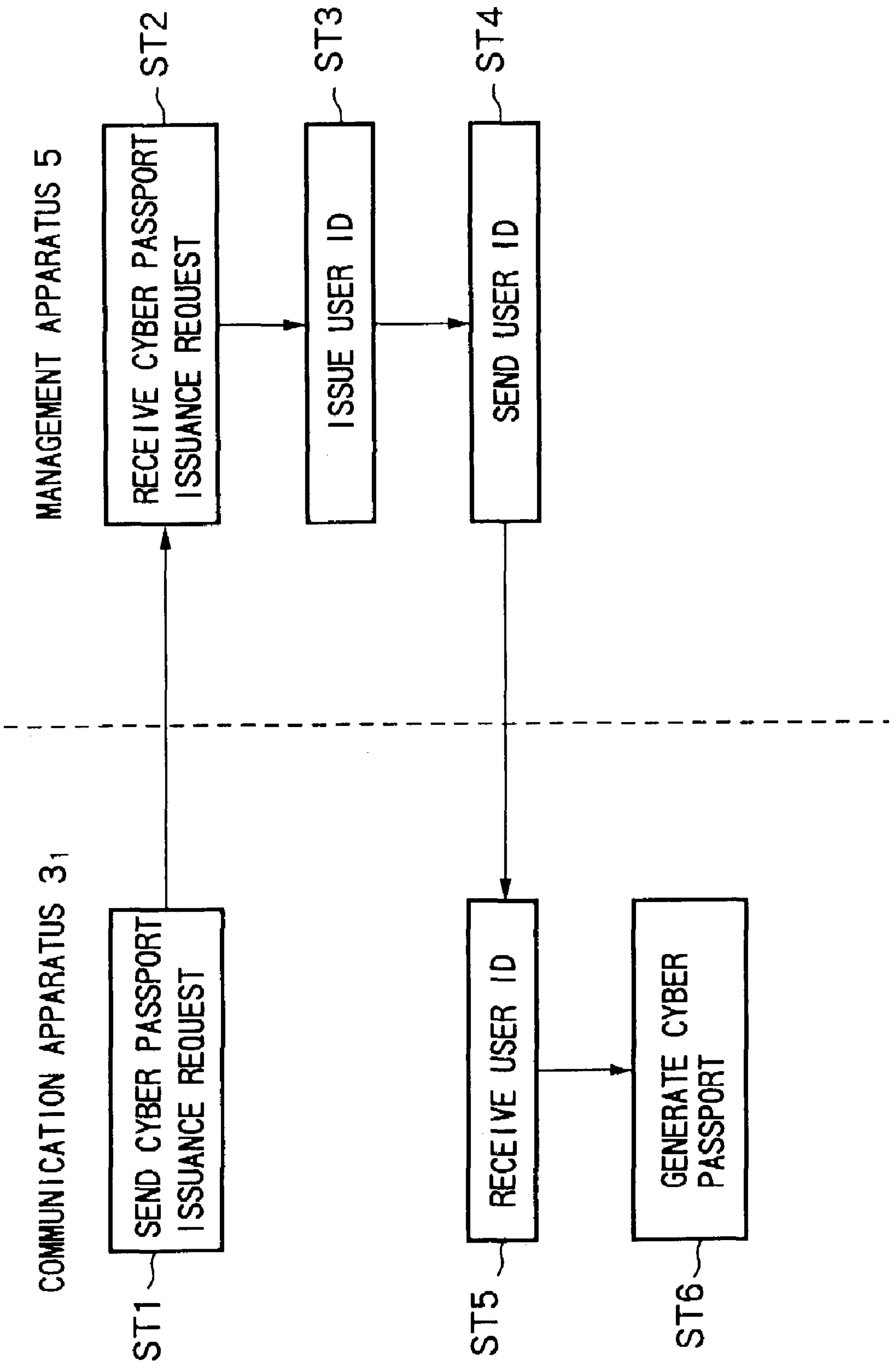
FIG. 7 is a flow chart for explaining a case where a user generates a cyber passport information module.

FIG. 7 is a flow chart for explaining the example of operation.

Step ST1:

The user $4_1$ operates the operation unit 31 of the communication apparatus 31 shown in FIG. 3 to generate the cyber passport issuance request. The cyber passport issuance request is sent from the communication interface unit 30 of the communication apparatus shown in FIG. 3 to the management apparatus 5 via the communications network 2.

Step ST2:

The cyber passport issuance request sent at step ST1 is received by the communication interface unit 50 of the management apparatus 5 shown in FIG. 5.

Step ST3:

Based on the user ID information issuance function module 61 shown in FIG. 6 obtained by executing a program read from the storage unit 53 by the processing unit 54 of the management apparatus 5, user ID information $U\_ID_1$ unique to the user $4_1$ is issued. Note that the passport ID information P_ID shown in FIG. 2 may be issued by the management apparatus 5 at step ST3 or may be issued by the user 4 by himself. When the user 4 issues the passport ID information P_ID, passport ID information P_ID issued by the user 4 and user ID information U_ID issued by the management apparatus 5 are connected when the user 4 accesses the management apparatus 5.

Step ST4:

The user ID information $V\_ID_1$ issued at step ST3 is sent from the communication interface unit 50 of the management apparatus 5 shown in FIG. 5 to the communication apparatus 31 via the communications network 2.

Step ST5:

The user ID information $U\_ID_1$ sent at step ST4 is received by the communication interface unit 30 of the communication apparatus $3_1$ shown in FIG. 3.

In the processing unit 35 of the communication apparatus $3_1$ shown in FIG. 3, a cyber passport information module $SPIM_1$ shown in FIG. 2 is generated by using the user ID information $U\_ID_1$ received at step ST5, information input by the user $4_1$ by using the operation unit 31, etc.

SECOND EXAMPLE OF OPERATION

In the present example of operation, a case of exchanging a view information module between the communication apparatuses $3_1$ and $3_2$ shown in FIG. 1 when the two communicate will be explained.

Figure 8:
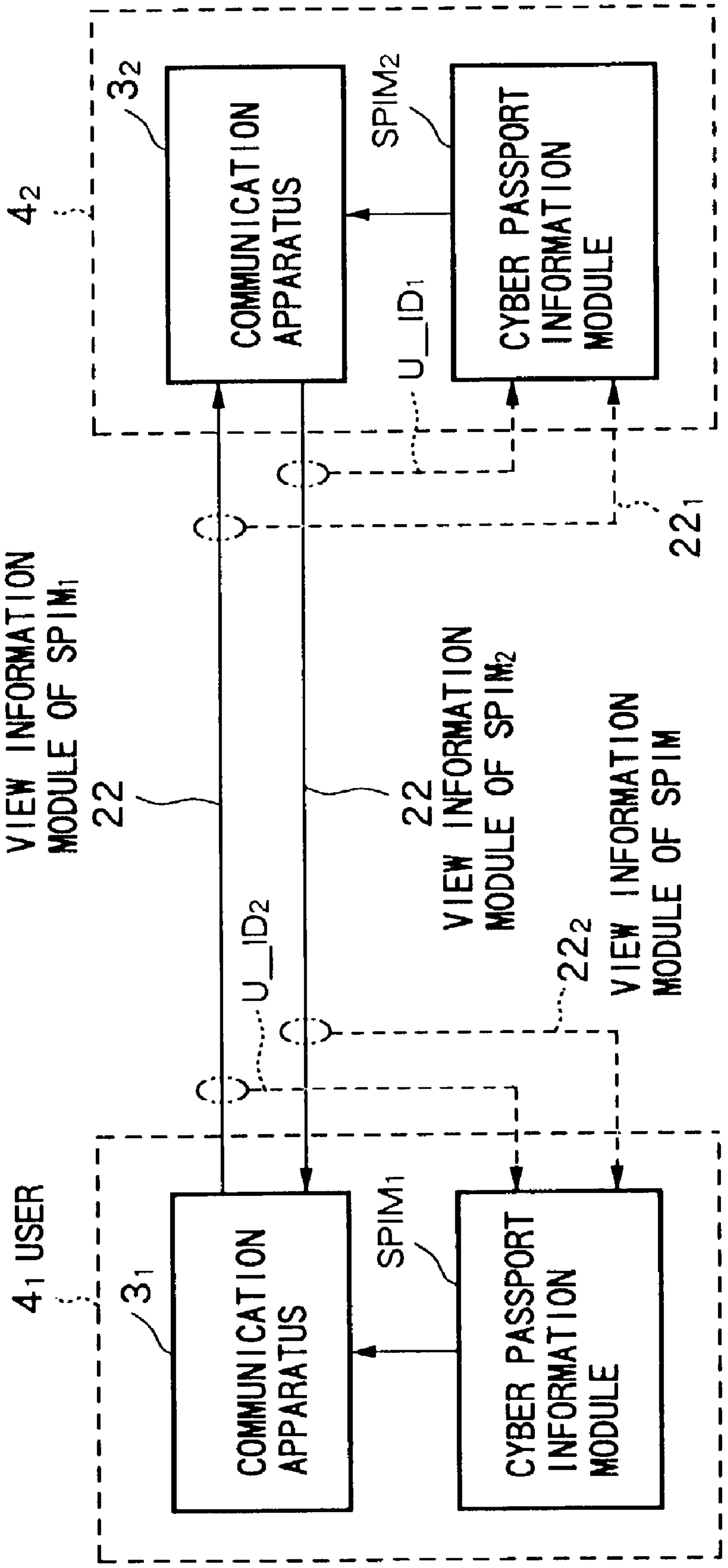
FIG. 8 is a view for explaining processing of exchanging view information modules between communication apparatuses shown in FIG. 1 when they communicate between them.
Figure 9:
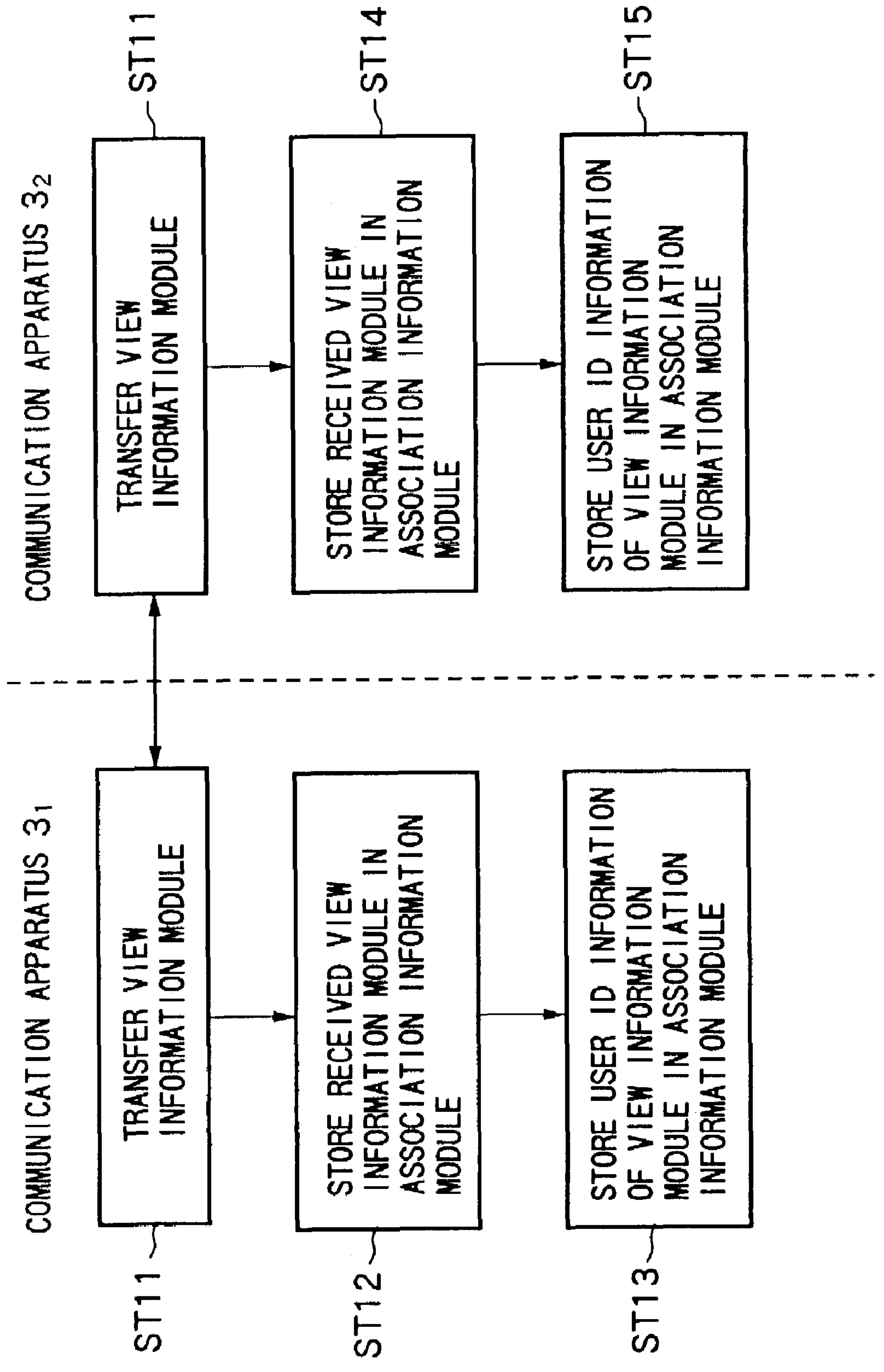
FIG. 9 is a flow chart for explaining the processing shown in FIG. 8.

FIG. 8 is a view for explaining a flow of information in the present example of operation, while FIG. 9 is a flow chart for explaining the present example of operation. When the communication apparatuses $3_1$ and $3_2$ communicate, they perform the processing described below.

Step ST11:

In the communication apparatus $3_1$, the view information module 22 in the cyber passport information module $SPIM_1$ stored in the user information module memory 33 is sent from the communication interface unit 30 to the communication apparatus 32 via the communications network 2 as shown in FIG. 8. Also, in the communication apparatus $3_2$, the view information module 22 in the cyber passport information module $SPIM_2$ stored in the user information module storage unit 33 is sent from the communication interface unit 30 to the communication apparatus $3_1$ via the communications network 2 as shown in FIG. 8.

Step ST12:

The communication apparatus $3_1$ stores the view information module 22 received from the communication apparatus $3_2$ at step ST11 in the association information module 24 shown in FIG. 2.

Step ST13:

The communication apparatus $3_1$ stores the user ID information $U\_ID_2$ of the user $4_2$ of the communication apparatus $3_2$ which sent the view information module $22_1$ of the user $4_1$ at step ST11 in the association information module 24 of the cyber passport information module $SPIM_1$.

Step ST14:

The communication apparatus $3_2$ stores the view information module 22 received from the communication apparatus $3_1$ at step ST11 in the association information module 24 shown in FIG. 2 of the user $4_2$.

Step ST15:

The communication apparatus $3_2$ stores the user ID information $U\_ID_1$ of the user $4_1$ of the communication apparatus $3_1$ which sent the view information module 22 of the user $4_2$ at step ST11 in the association information module 24 of the cyber passport information module $SPIM_2$.

THIRD EXAMPLE OF OPERATION

In the present example of operation, a case where the communication apparatus 31 requests a user query to the management apparatus 5 will be explained.

Figure 10:
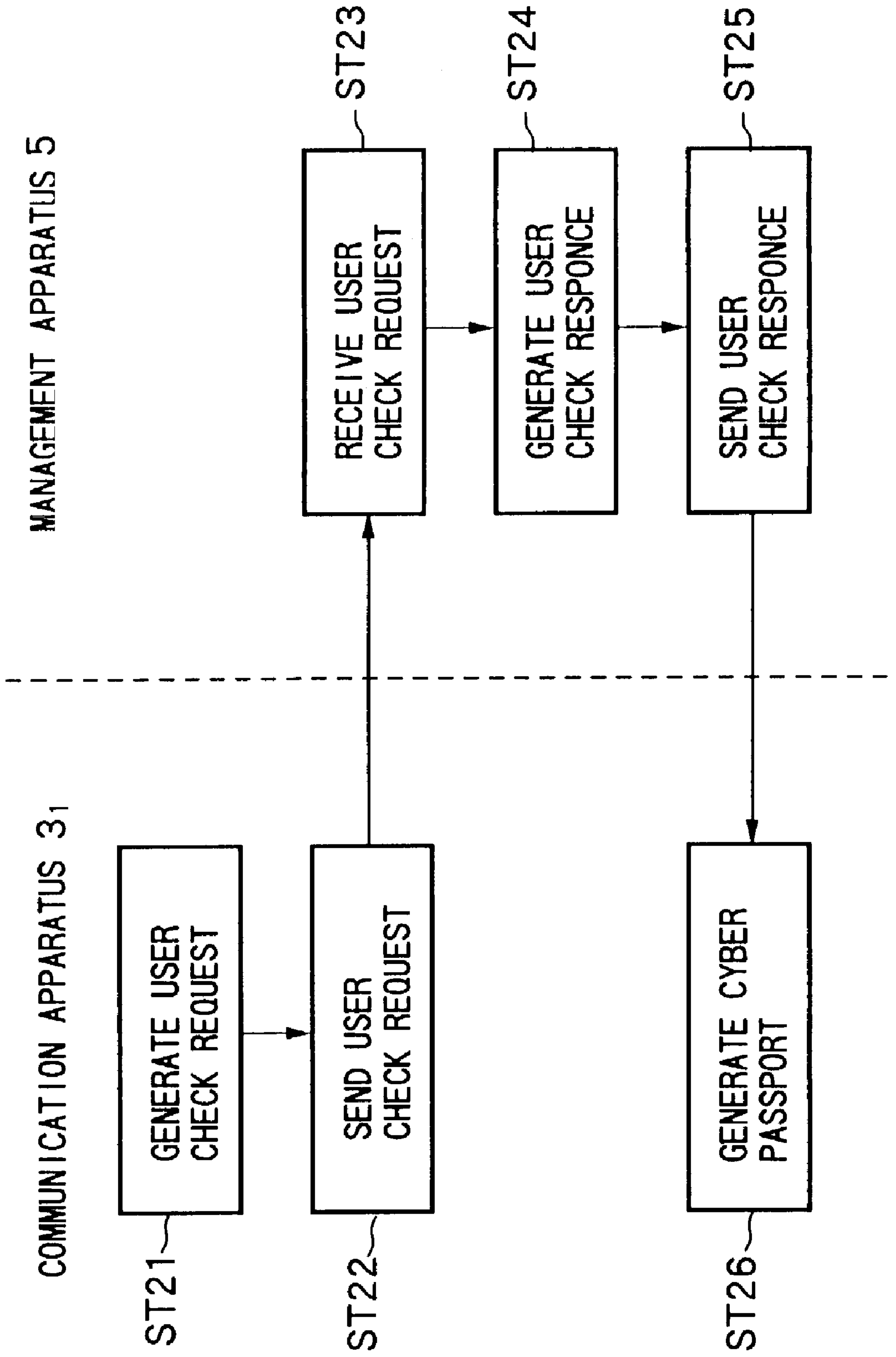
FIG. 10 is a flow chart for explaining a case where a communication apparatus shown in FIG. 1 requests a user query to a management apparatus.

FIG. 10 is a flow chart for explaining the present example of operation.

Step ST21:

The user $4_1$ operates the operation unit 31 of the communication apparatus $3_1$ shown in FIG. 3 to for example specify contents of his own cyber passport information module $SPIM_1$ or contents of the view information module 22 of the user $4_2$ received from the communication apparatus $3_2$ and generate a user query request.

Step ST22:

The user query request generated at step ST21 is sent from the communication interface unit 30 of the communication apparatus $3_1$ shown in FIG. 3 to the management apparatus 5 via the communications network 2.

Step ST23:

The user query request sent at step ST22 is received by the communication interface unit 50 of the management apparatus 5 shown in FIG. 5.

Step ST24:

In the processing unit 54 of the management apparatus 5 shown in FIG. 5, the user management information stored in the storage unit 53 is referred to based on the user query function module 63 shown in FIG. 6 obtained by executing a program read from the storage unit 53. A query result is obtained by judging whether the contents specified by the user query request are correct or not, whereupon a user query response including the query result is generated.

Step ST25:

The user query response generated at step ST24 is sent from the communication interface unit 50 of the management apparatus 5 shown in FIG. 5 to the communication apparatus $3_1$ via the communications network 2.

Step ST26:

The user query response sent at step ST25 is received by the communication interface unit 30 of the communication apparatus $3_1$. The received user query response is processed in the processing unit 35 and displayed on the display unit 32.

FOURTH EXAMPLE OF OPERATION

In the present example of operation, a case where the communication apparatus $3_1$ shown in FIG. 1 requests issuance of electronic money to the management apparatus 5 will be explained.

Figure 11:
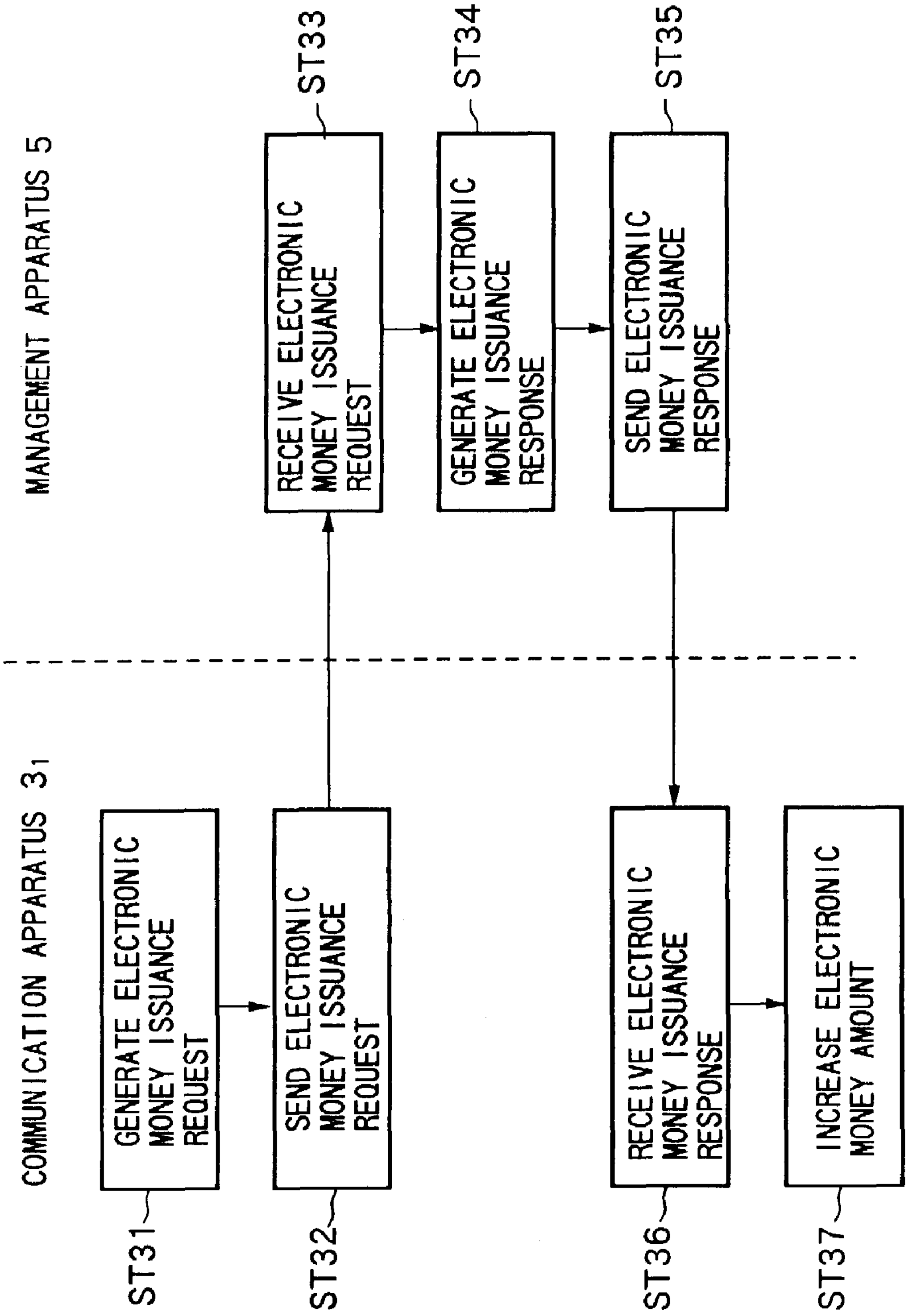
FIG. 11 is a flow chart for explaining a case where the communication apparatus shown in FIG. 1 requests issuance of electronic money to a management apparatus.

FIG. 11 is a flow chart for explaining the present example of operation.

Step ST31:

The user $4_1$ operates the operation unit 31 of the communication apparatus $3_1$ shown in FIG. 3 designate the amount of the electronic money which is required to be issued and generate an electronic money issuance request.

Step ST32:

The electronic money issuance request generated at step ST31 is sent from the communication interface unit 30 of the communication apparatus $3_1$ shown in FIG. 3 to the management apparatus 5 via the communications network 2.

Step ST33:

The electronic money issuance request sent at step ST32 is received by the communication interface unit 50 of the management apparatus 5 shown in FIG. 5.

Step ST34:

The processing unit 54 of the management apparatus shown in FIG. 5 performs processing for issuing a designated amount of electronic money to the user $4_1$ based on the electronic money management function module 66 shown in FIG. 6 obtained by executing a program read from the storage unit 53 and thereby generates an electronic money issuance response.

Step ST35:

The electronic money issuance response generated at step ST34 is sent from the communication interface unit 50 of the management apparatus 5 shown in FIG. 5 to the communication apparatus $3_1$ via the communications network 2.

Step ST36:

The electronic money issuance response sent at step ST35 is received by the communication interface unit 30 of the communication apparatus $3_1$.

Step ST37:

In accordance with an electronic money issuance response received at step ST36, the processing unit 35 (shown in FIG. 3) increases the amount of the electronic money in the cyber passport information module $SPIM_1$ based on the electronic money management function module 44 (shown in FIG. 4) obtained by executing a program read from the storage unit 34.

FIFTH EXAMPLE OF OPERATION

In the present example of operation, a case where the communication apparatus $3_1$ shown in FIG. 1 requests payment of electronic money to the communication apparatus $3_2$ will be explained.

Figure 12:
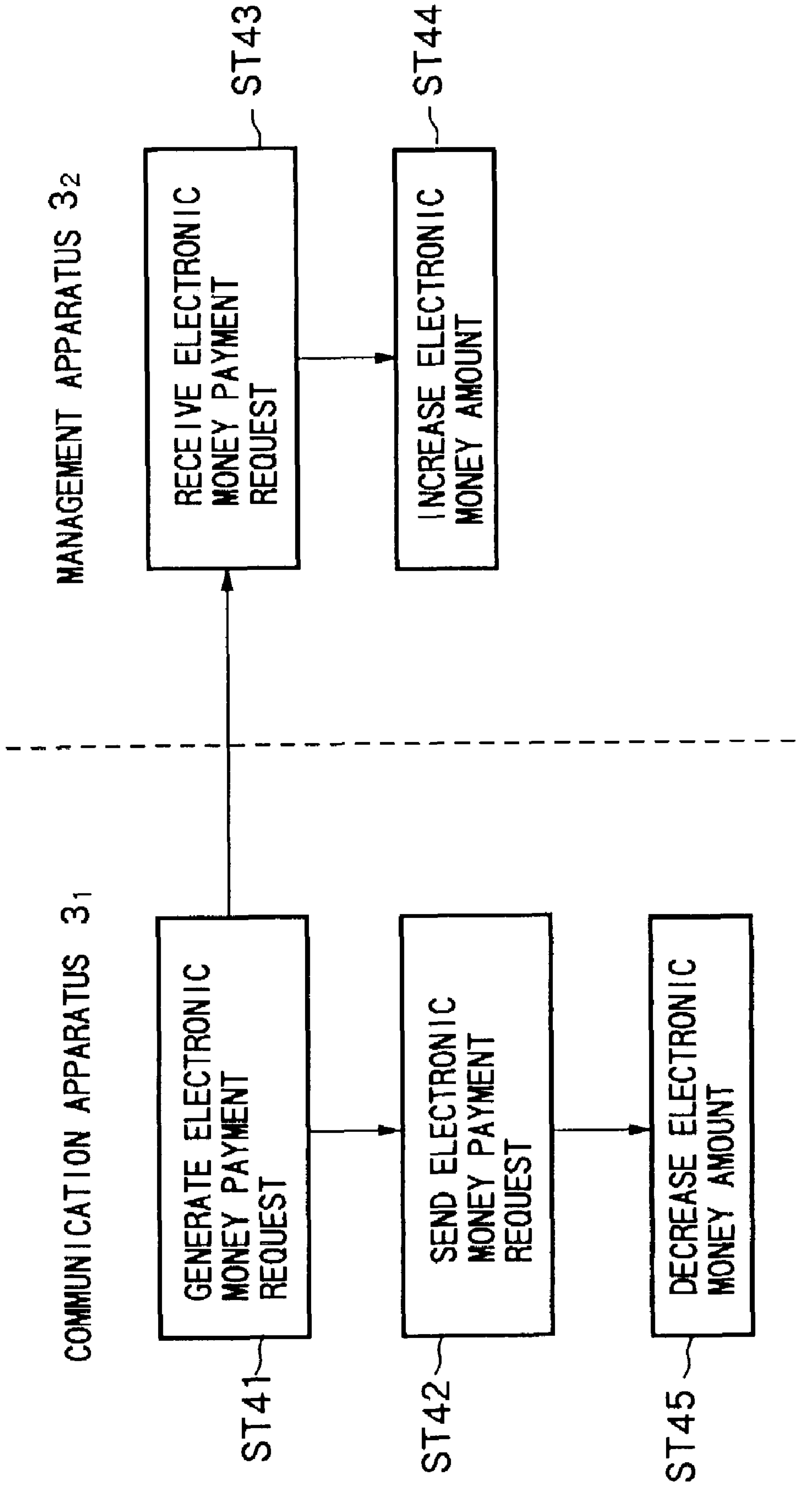
FIG. 12 is a flow chart for explaining a case where the communication apparatus shown in FIG. 1 requests payment of electronic money to another communication apparatus.

FIG. 12 is a flow chart for explaining the present example of operation.

Step ST41:

The user $4_1$ operates the operation unit 31 of the communication apparatus $3_1$ shown in FIG. 3 to, for example, specify an amount of electronic money to be paid and generate an electronic money issuance request.

Step ST42:

The electronic money payment request generated at step ST41 is sent from the communication interface unit 30 of the communication apparatus $3_1$ shown in FIG. 3 to the communication apparatus $3_2$ via the communications network 2.

Step ST43:

The electronic money payment request sent at step ST42 is received by the communication interface unit 30 of the communication apparatus (shown in FIG. 3).

Step ST44:

In accordance with an electronic money payment request received at step ST43, the processing unit 35 shown in FIG. 3 of the communication apparatus $3_2$ executes a program read from the storage unit 34. Based on the thus obtained electronic money management function module 44 (shown in FIG. 4), the amount of electronic money indicated in account information in the property information module 23 of the cyber passport information module $SPIM_2$ is increased.

Step ST45:

In accordance with the transmission of the electronic money payment request at step ST42, a program read from the storage unit 34 is executed in the processing unit 35 shown in FIG. 3 of the communication apparatus $_1$. Based on the electronic money management function module 44 shown in FIG. 4 obtained thereby, the amount of electronic money indicated in the account information in the property information module 23 of the cyber passport information module $SPIM_1$ is decreased.

SIXTH EXAMPLE OF OPERATION

In the present example of operation, a case where the communication apparatus $3_1$ shown in FIG. 1 sends check information to the communication apparatus $3_2$ and makes settlement based on the check information in the management apparatus 5 will be explained.

Figure 13:
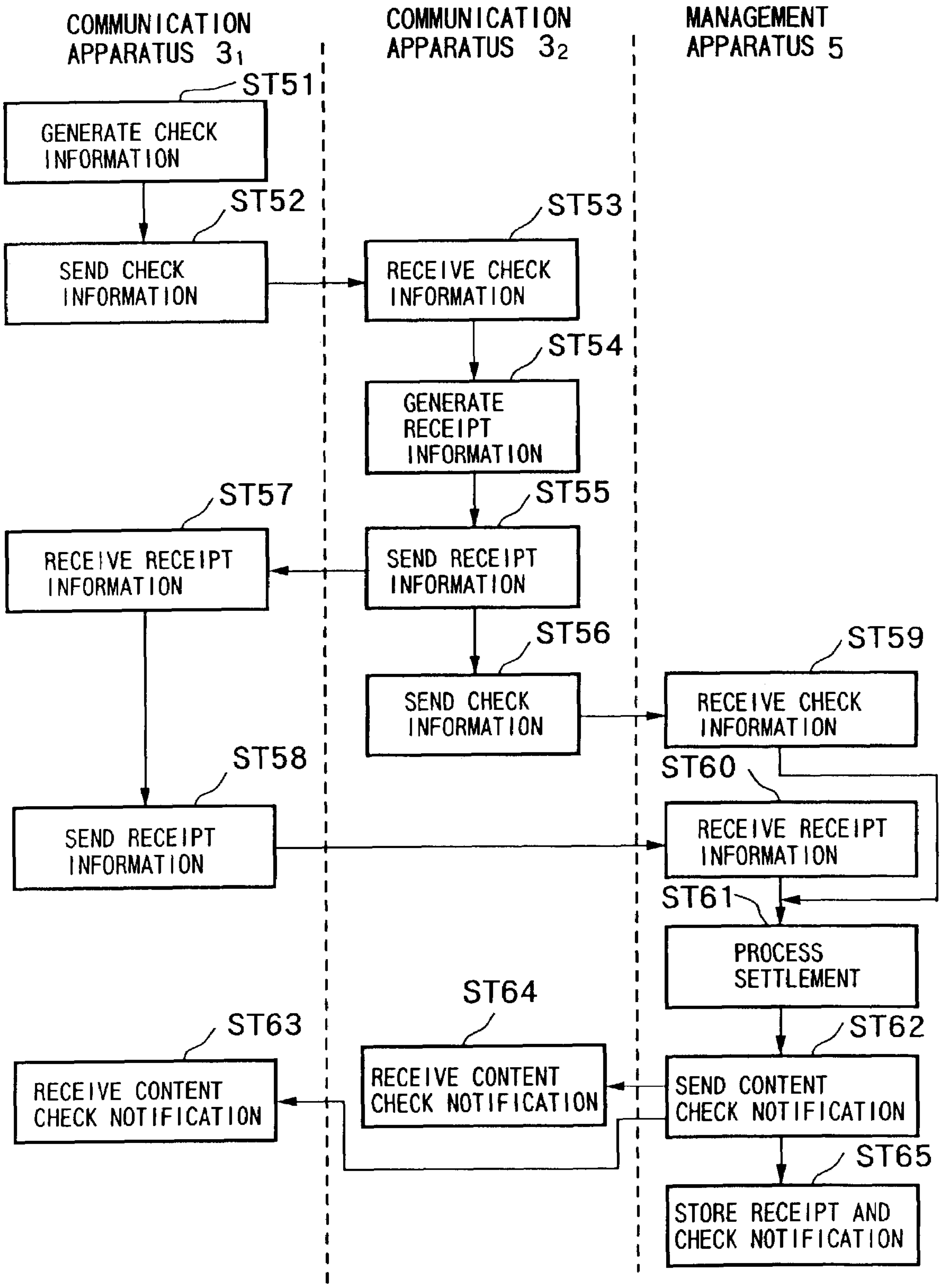
FIG. 13 is a flow chart for explaining a case where a communication apparatus sends check information to another communication apparatus and a management apparatus performs settlement based on the check information.

FIG. 13 is a flow chart for explaining the example of operation.

Step ST51:

The operation unit 31 of the communication apparatus $3_1$ shown in FIG. 3 is operated by the user $4_1$, then the processing unit 35 executes a program read from the storage unit 34. Based on the thus obtained check management function module 45 shown in FIG. 4, check information specifying an amount of money for the user $4_2$ to pay by a check is generated. Also, the check information is stored as account information in the property information module 23 shown in FIG. 2 of the cyber passport information module $SPIM_1$ of the user $4_1$ by the processing unit 35.

Step ST52:

The check information generated at step ST51 is sent from the communication interface unit 30 of the communication apparatus $3_1$ shown in FIG. 3 to the communication apparatus $3_2$ via the communications network 2.

Step ST53:

The check information sent at step ST52 is received by the communication interface unit 30 of the communication apparatus $3_2$ shown in FIG. 3.

Step ST54:

The processing unit 35 of the communication apparatus $3_2$ shown in FIG. 3 executes a program read from the storage unit 34. Based on the thus obtained check management function module 45 shown in FIG. 4, the check information is stored as account information in the property information module 23 shown in FIG. 2 of the cyber passport information module $SPI_2$. Also, the processing unit 35 generates receipt information regarding reception of the check information.

Step ST55:

The receipt information generated at step ST54 is sent from the communication interface unit 30 of the communication apparatus $3_2$ shown in FIG. 3 to the communication apparatus $3_1$ via the communications network 2.

Step ST56:

The check information received at step ST53 is sent from the communication interface unit 30 of the communication apparatus $3_2$ shown in FIG. 3 to the management apparatus 5 via the communications network 2.

Step ST57:

The check information sent from the communication apparatus $3_2$ at step ST55 is received by the communication interface unit 30 of the communication apparatus $3_1$ shown in FIG. 3.

Step ST58:

The receipt information received by the communication apparatus $3_1$ at step ST57 is sent from the communication interface unit 30 shown in FIG. 3 of the communication apparatus $3_1$ to the management apparatus 5 via the communications network 2.

Step ST59:

The check information sent by the communication apparatus $3_2$ at step ST56 is received by the communication interface unit 50 of the management apparatus 5 shown in FIG. 5.

Step ST60:

The receipt information sent by the communication apparatus $3_1$ at step ST58 is received by the communication interface unit 50 of the management apparatus 5 shown in FIG. 5.

Step ST61:

When the check information is received at step ST59, a program read from the storage unit 53 is executed in the processing unit 54 of the management apparatus 5 shown in FIG. 5. Based on the thus obtained check information processing module 67 shown in FIG. 6, settlement processing is performed based on the check information received at step ST59 and the receipt information received at step ST60. On the other hand, when the receipt information is received at step ST60, the settlement processing is performed based on the receipt information.

Step ST62:

A content verification notice regarding contents of the account settlement performed at step ST61 is generated by the processing unit 54 of the management apparatus 5 shown in FIG. 5. Then, when settlement is performed based on the check information, the content verification notice is sent to the communication apparatus $3_2$. On the other hand, when settlement is performed based on the receipt information, the content verification notice is sent to the communication apparatus $3_1$.

Step ST63:

The content verification notice sent from the management apparatus 5 at step ST62 is received by the communication interface unit 30 of the communication apparatus $3_1$ shown in FIG. 3 and the content is displayed on the display unit 32.

Step ST64:

The content verification notice sent from the management apparatus 5 at step ST62 is received by the communication interface unit 30 of the communication apparatus $3_2$ shown in FIG. 3 and the content is displayed on the display unit 32.

Step ST65:

The management apparatus 5 stores the receipt information and the check information.

The check information and receipt information used in the account settlement processing are stored in the storage unit 53 of the management apparatus 5 shown in FIG. 5.

SEVENTH EXAMPLE OF OPERATION

In the present example of operation, processing of the communication apparatus $3_1$ and the management apparatus 5 when the communication apparatus $3_1$ shown in FIG. 1 accesses the management apparatus 5 will be explained. The processing described below is for example automatically performed when the communication apparatus $3_1$ accesses the management apparatus 5 for some reason.

Figure 14:
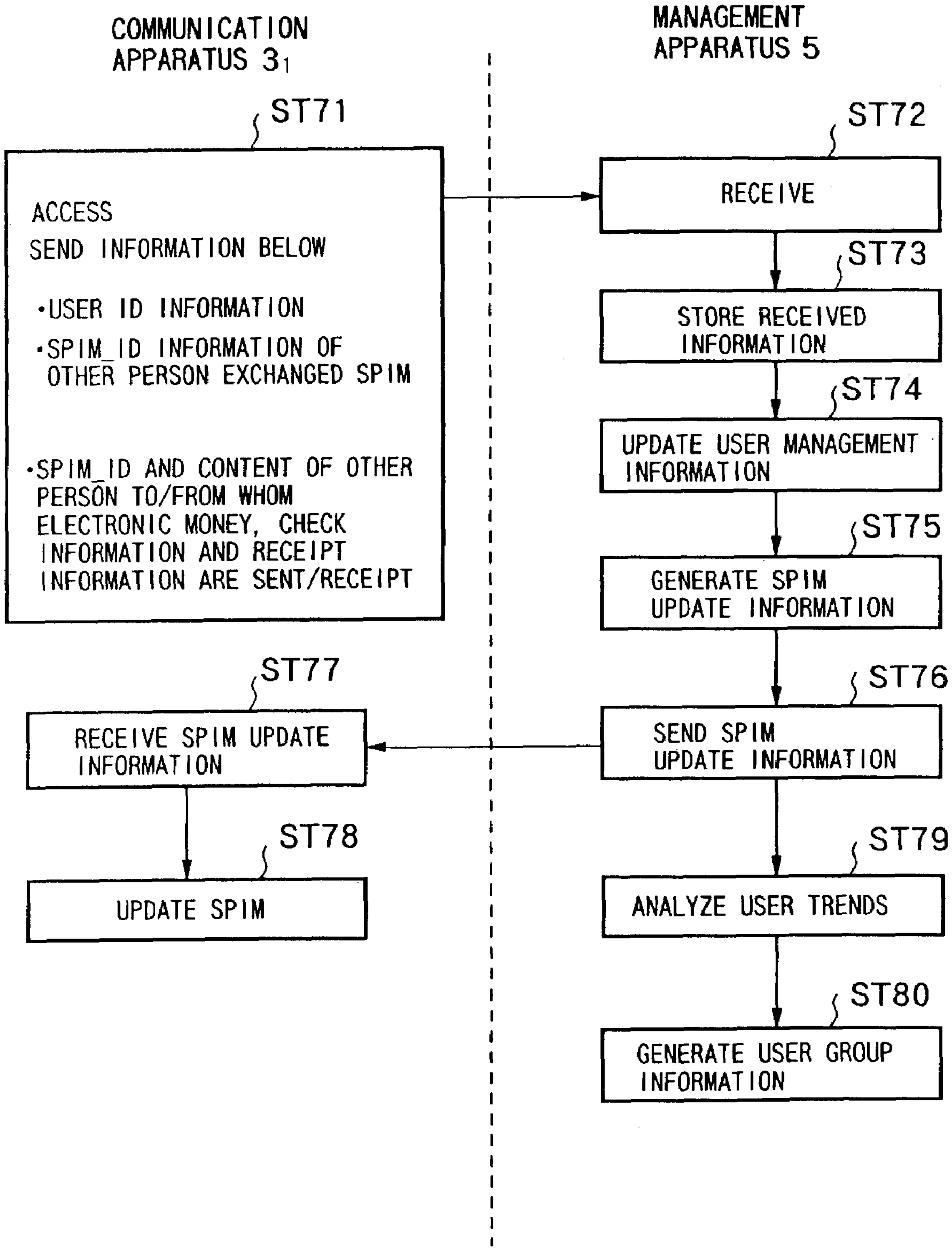
FIG. 14 is a flow chart for explaining processing of a communication apparatus and a management apparatus when the communication apparatus shown in FIG. 1 accesses the management apparatus.

FIG. 14 is a flow chart for explaining the example of operation.

Step ST71:

When the communication apparatus $3_1$ accesses the management apparatus 5 via the communications network 2, as described below, predetermined information in the cyber passport information module $SPIM_1$ of the user $4_1$ stored in the storage unit 34 shown in FIG. 3 is sent from the communication interface unit 30 to the management apparatus 5 via the communications network 2. The information to be sent is, for example, user ID information U_ID of the user $4_1$, passport ID information P_ID, account information, and passport ID information P_ID to which the view information module 22 of the user $4_1$ is sent, etc.

Step ST72:

The information sent from the communication apparatus $3_1$ at step ST71 is received by the communication interface unit 50 of the management apparatus 5 shown in FIG. 5.

Step ST73:

In the management apparatus 5 shown in FIG. 5, the information received at step ST72 is written in the storage unit 53.

Step ST74:

The processing unit 54 of the management apparatus 5 shown in FIG. 5 executes a program read from the storage unit 53 and uses the information received at step ST72 to update user management information based on the user management information update function module 62 shown in FIG. 6 obtained thereby.

Step ST75:

The processing unit 54 of the management unit 54 of the management apparatus 5 shown in FIG. 5 generates SPIM update information for updating the cyber passport information module $SPIM_1$ of the user $4_1$ based on the user management information update function module 62.

Step ST76:

The SPIM update information generated at step ST75 is sent from the communication interface unit 50 of the management apparatus 5 shown in FIG. 5 to the communication apparatus $3_1$ via the communications network 2.

Step ST77:

The SPIM update information sent at step ST76 is received by the communication interface unit 30 of the communication apparatus $3_1$ shown in FIG. 3.

Step ST78:

The processing unit 35 of the communication apparatus $3_1$ shown in FIG. 3 executes a program read from the storage unit 34. Then, based on the thus obtained SPIM editing function module 42 shown in FIG. 4, it edits (updates) the cyber passport information module $SIPM_1$ of the user $4_1$ stored in the user information module storage unit 33 in accordance with the SPIM update information received at step ST77.

Step ST79:

The processing unit 54 of the management apparatus 5 shown in FIG. 5 executes a program read from the storage unit 53. Then, based on the thus obtained user trend analysis function module 64 shown in FIG. 6, it uses the information received at step ST72 to analyze the trends of users and generate analysis information. In the analysis, for example, it analyzes trends in consumption of users such as personal tastes in consumption based on types of businesses of service providers (having cyber passport information modules) used by the users. The analysis information is written in the storage unit 53 shown in FIG. 5.

Step ST80:

The processing unit 54 of the management apparatus 5 shown in FIG. 5 executes a program read from the storage unit 53. Then, based on the thus obtained user group information generation function module 65 shown in FIG. 6, it uses the information received at step ST72 to analyze the interrelationships between a plurality of users and generate group information obtained by grouping users having strong relationships. The group information is written in the storage unit 53 shown in FIG. 5.

Below, an example of the above explained communication system 1 wherein a variety of communities can be formed on the communications network 2 by communication via the communications network 2 using the cyber passport information modules explained above will be explained.

[Community Forming Method]

Figure 15:
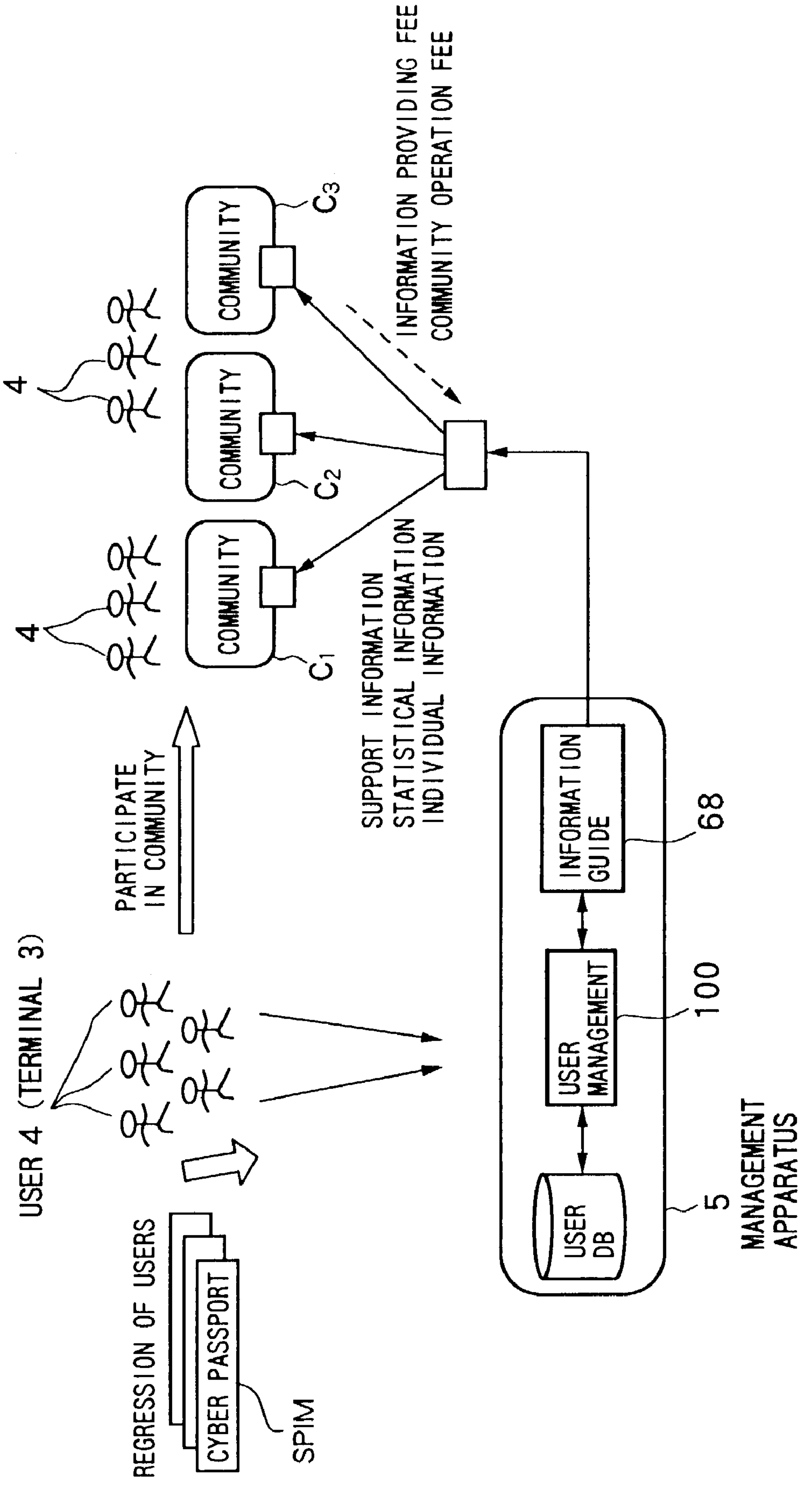
FIG. 15 is a view of a schematic relationship of communities formed by a plurality of users on a communications network shown in FIG. 1 for providing mutual information services and a management apparatus for managing them.

FIG. 15 is a view of the schematic relationship of communities comprised of pluralities of users 4 offering mutual information services on the communications network 2 and a management apparatus 5 for managing them.

In FIG. 15, the management apparatus 5, as explained above, comprises a user management function module 100 comprised of a user ID information issuance function module 61, a user management information update function module 62, a user query function module 63, a user trend analysis function module 64, a user group information generation function module 65, an electronic money management function module 66, a check information processing module 67, etc. and an information guide function module 68 for introducing communities to users 4. The user 4 connects from a communication apparatus 3 to the management apparatus 5 by using his cyber passport information module SPIM to utilize the information guide function module 68 of the management apparatus 5.

Communities $C_1$, $C_2$, and $C_3$ include communities wherein an information service provider provides a predetermined service and users 4 suitably participate in the community to utilize the service and communities suitably formed by users 4 and in which an information service provider participates in accordance with need. Alternately, there are non-profit communities formed by gathering users 4 at any time. The explanation will be given classifying these communities in accordance with the characteristics to publishing event type communities, participation event type communities, and creative private type communities.

In the communication system 1, an information service provided by an information service provider is used by an information service user in a community or information fees and service fees relating to direct exchanges of information between information service users are collected and received by the communication apparatuses $\mathbf{3}_1$, $\mathbf{3}_2$, and $\mathbf{3}_3$ using an electronic business transaction function (for example, a function based on the account information and association information module 24 shown in FIG. 2) of the cyber passport information module SPIM.

Note that the management apparatus 5 is run, for example, by fees for introducing users to information service providers and providing information concerning characteristics of users obtained by user management information and fees collected along with electronic business transactions relating to use in an information community.

<Publishing Event Type Community>

Figure 16:
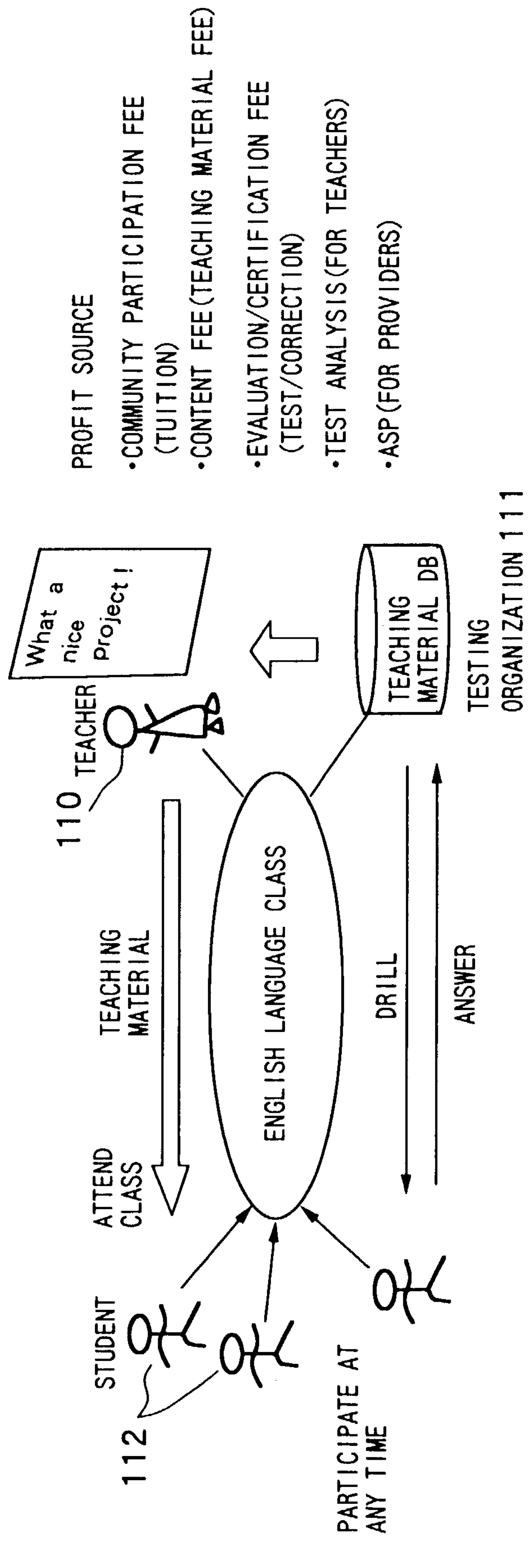
FIG. 16 is a view for explaining a case where a regularly held English language class is provided as an information service by using the communication system shown in FIG. 1 and a community for learning English is formed by users participating at any time.

FIG. 16 is a view for explaining a case where a community is formed where a suitably held English language class is provided as an information service using the communication system 1 shown in FIG. 1 and users 4 participate at any time for learning English. In FIG. 16, a teacher 110, a testing organization 111, and students 112 respectively have cyber passport information modules SPIM and access the management apparatus 5 by using their communication apparatuses 3. The teacher 110 and other information service providers gain profit from community participation fees (tuition), content fees (teaching material fees), and evaluation and certification fees by tests and correction. In a community of this kind, the testing organization 111 may furthermore form a community as an information service provider in which teachers can participate at any time and use test materials or test analysis services.

<Participation Event Type Community>

Figure 17:
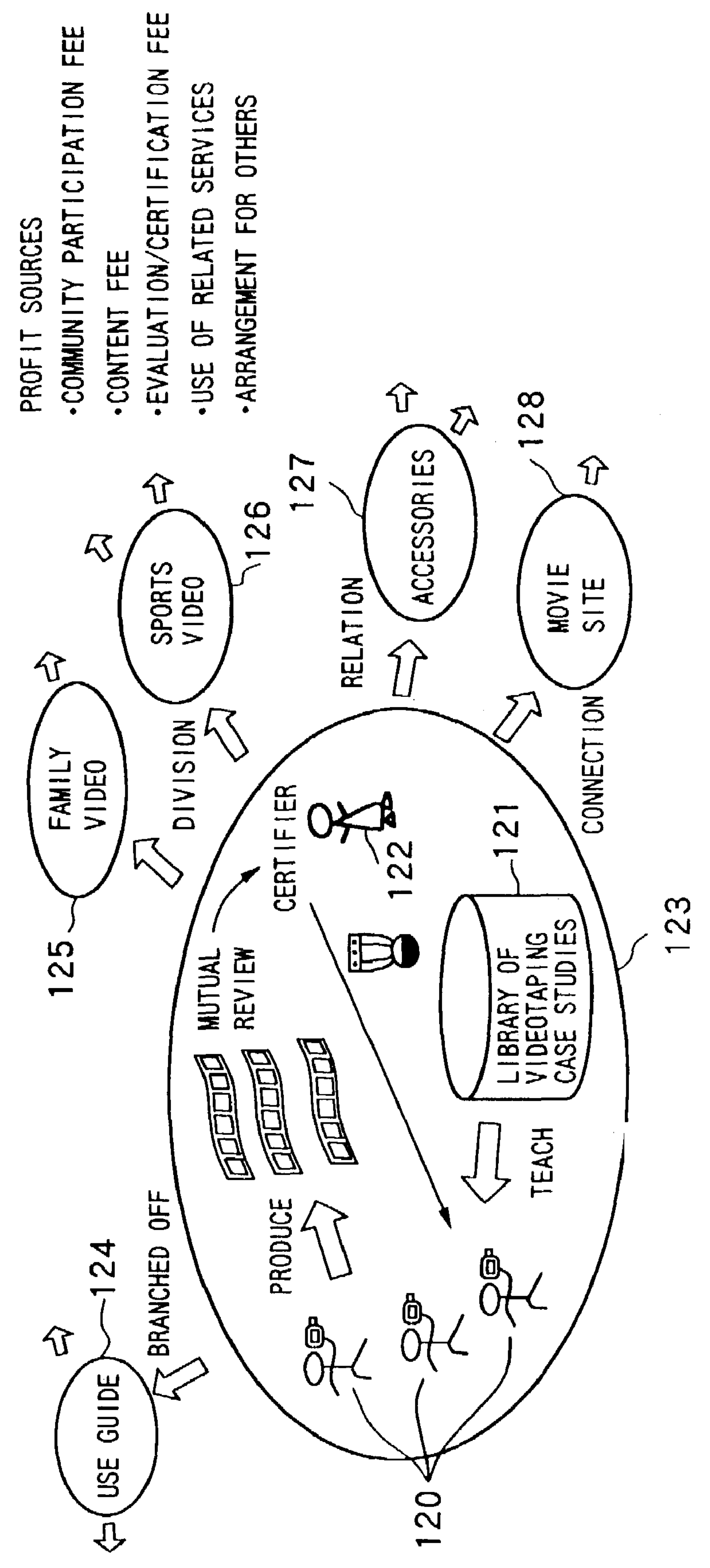
FIG. 17 is a view for explaining a case where users having video cameras for videotaping form a community for the purpose of improving videotaping skills by using the communication system shown in FIG. 1.

FIG. 17 is a view for explaining a case where users having video cameras for videotaping form a community for the purpose of improving videotaping skills by using the communication system 1 shown in FIG. 1. In FIG. 17, the user 120 and the certifier 122 respectively have cyber passport information modules SPIM and access the management apparatus 5 by using their communication apparatuses 3. Here, users 120 participating at any time refer to videotaping case studies from the video library 121 and bring their own videotaped works for mutual review by the users 120. Also, the certified 122 participates at any time and suitably certifies the skills of the users 120.

Such a community 123 may be branched off into a use instruction community where users 120 having higher skills provide instructions on videotaping method to beginners. Alternatively, the present community itself may be subdivided in accordance with the contents of the videotaped works to a family video community 125, a sports video community 126, etc. Also, it is possible to introduce the users 120 to a related accessory community 127 when accessories becomes necessary in videotaping a work or to introduce them to a movie community 128 assumed to be desired by the users 120. The information service provider can gain profit from fees for introducing and connecting up users to communities of related information services in addition to community participation fee by the users, content fees, and evaluation and certification fees. The fees for introduction and connection can be collected via the management apparatus 5.

<Creative Private Type Community>

Figure 18:
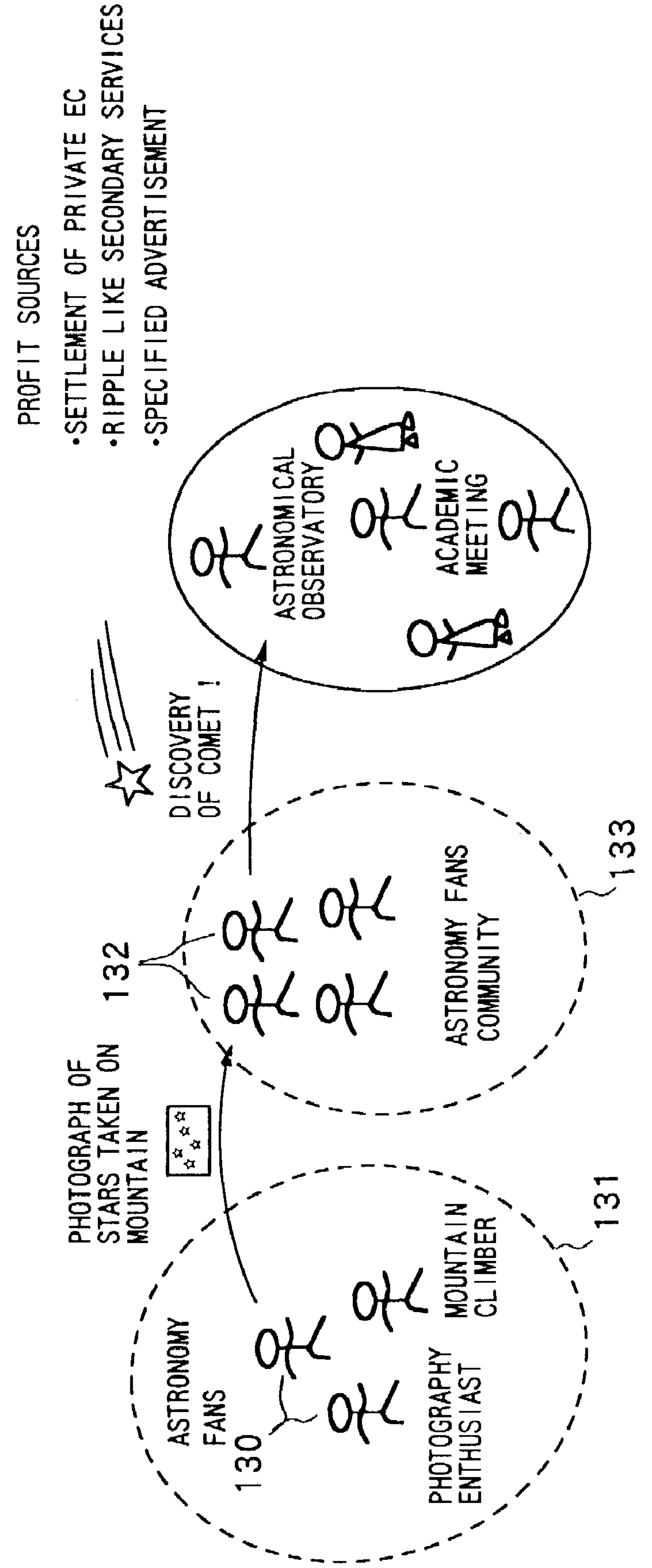
FIG. 18 is a view for explaining a case of forming a community by encounters of users on the communications network (network) using the communication system shown in FIG. 1.

FIG. 18 is a view for explaining a case of forming a community by encounters of users on a communications network (network) 2 using the communication system 1 shown in FIG. 1. In FIG. 18, users 130 and astronomy fans 132 hold their own cyber passport information modules SPIM and access the management apparatus 5 by using their communication apparatuses 3. As shown in FIG. 18, users 130 having astronomy, photography, and mountain-climbing as hobbies temporarily form a community 131 to jointly climb a mountain to photograph stars. Furthermore, an astronomy fan 130 having a picture participates in an astronomy fan community 133 to get an evaluation of the picture and further participates in an astronomical observatory or academic meeting community 134 with the result. Such communities are not participated in by profit-oriented information service providers for making profits. However, due to access to the management apparatus 5 by the users 130 based on information exchanges therein, it is possible to analyze and obtain relationships and common topics of the users 130 by the user management function 100 of the management apparatus 5. The information is furthermore used in the information guide function module 68 of the management apparatus 5.

Also, it is possible for a specific user to bring a banner advertisement so that participants in the community can look at the advertisement. In this case, for example, it is possible for a provider of an advertisement to pay an advertisement commission to the user who brought the advertisement in accordance with the number of times other community participants look at the advertisement. Payment of the advertisement commission is made by the electronic business transaction function of the cyber passport information modules SPIM of the users. Also, information of users can be exchanged between the users and payment for the same can be made by the electronic business transaction function of the cyber passport information modules SPIM in the same way. Each of the above communities can be attained by using personal computers on the Internet and by using mobile phones and PDA (Personal Digital Assistants). When a PDA is used, a creative private type community can be particularly easily realized by direct communication functions between PDAs.

<Role of Cyber Passport Information Module SPIM>

The role of the cyber passport information module SPIM in the above explained communities will be summarized.

Figure 19:
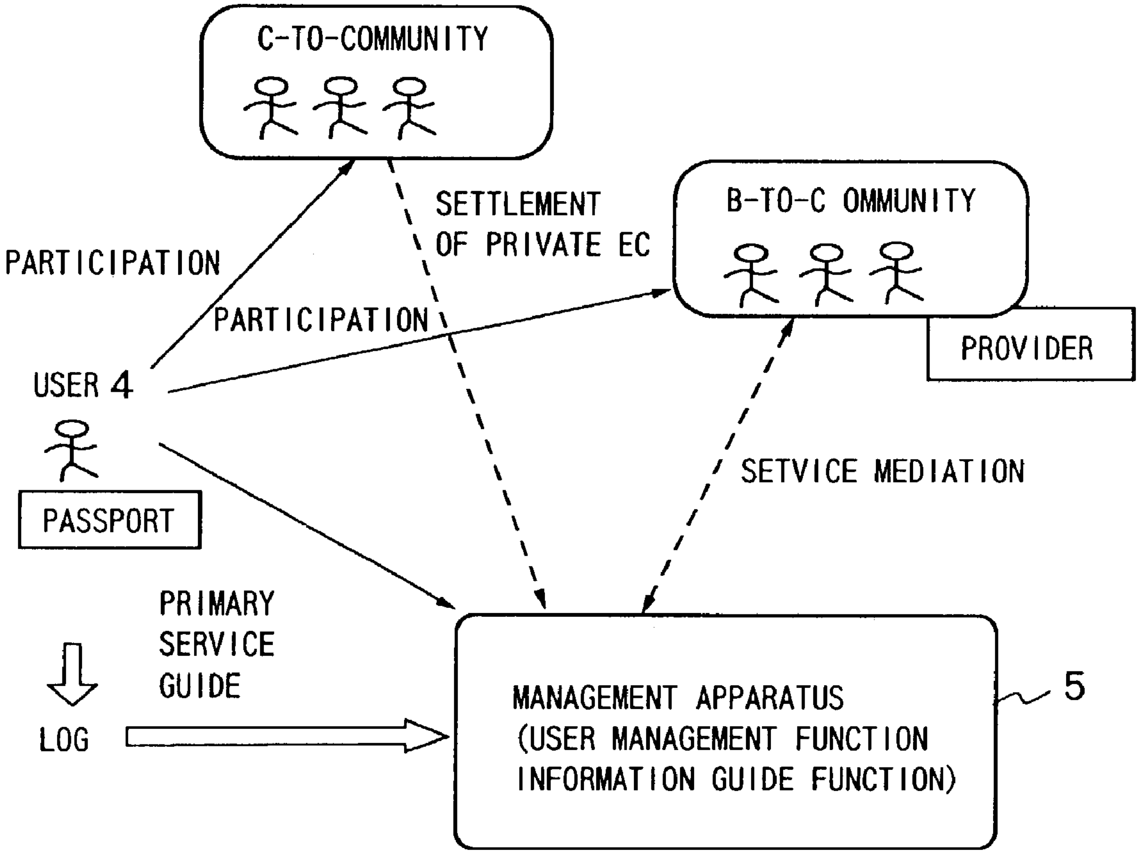
FIG. 19 is a view for explaining a role of a cyber passport information module SPIM.

FIG. 19 is a view for explaining the role of the cyber passport information module SPIM. The above explained creative private type community belongs to so-called C-to-C type communications. In such a format, information is exchanged without using any specific server functions. Thus, it was difficult to realize a method of making profits even if fee-based information was exchanged or services provided. However, according to the above method using the cyber passport information modules SPIM, electronic business transactions can be realized even in such a case.

Even in a B-to-C community, making profits was difficult when providing information services not using specific server functions. In this case, however, electronic business transactions are realized in the same way. Also, when a provider providing an information service uses other information and services, users can be charged in the same way.

When a user 4 is active in these communities, the user 4 exchanges the view information module 22 stored in the cyber passport information module SPIM and suitably uses the user management function module 100 of the management apparatus 5. In this case, by analyzing the relationship between users, users 4 having identical mutual relationships can be grouped together. At this time, if there are users whose user information such as hobbies and tastes is managed among the users 4, a grasp is obtained of the trends in consumption of information of other users 4 and a group of the users 4 from the above mutual relationships and market research on the communications network 2 can be realized.

To realize the functions, a user function of a user 4 having the cyber passport information module SPIM needs to be connected to for example the user management function module 100 of the management apparatus 5. However, the connection can be promoted by introducing new services in the management apparatus 5 to the user 4 of information services and by introducing the user 4 of the new information services to the information service provider.

Also, for exchanges of information concerning user identification information between the users 4, it is possible to collect the information and engage in promotional activities offering cyber passport information modules SPIM of special specifications such as the method of display from the management apparatus 5. It is not necessary that all users 4 having cyber passport information modules SPIM visit the management apparatus 5. The above function can be realized by visits of some of the users 4.

As explained above, according to the communication system 1, a user identification means can be provided on the communications network 2 (network), mutual reference is possible on the communications network 2, and the management apparatus 5 can obtain a global grasp of the reference relationship (exchange relationship) on the communications network 2. Also, according to the communication system 1, it is possible to hold an image in the cyber passport information module SPIM to provide a photograph or an easy to understand user expression means simulating a name card, ID card, etc. in accordance with the types of images. As a result, exchanges between the users 4 are encouraged and an increase of information concerning the users 4 can be expected.

Also, according to the communication system 1, not only is a grasp obtained of trends of the users 4 by just specific function sites of a server etc., but also a grasp is obtained of trends concerning direct exchanges of information between the users. Furthermore, according to the communication system 1, not only can a grasp be obtained of trends of individual users, but also a grasp can be obtained of trends of groups of the users 4. By obtaining a grasp of group trends, it is possible to obtain a grasp of trends of individual users synergistically from information of users 4 belonging to the groups. Also, when the group is an information community, an improvement of services such as a provision of higher grade information to the community can be expected. Also, according to the communication system 1, by sending a guide of information and services to a group of the users 4 or to a group obtained by grouping those liable to form a group, it is possible to promote formation of an information community among them. Also, according to the communication system 1, since a means of exchange of currency or vouchers for electronic business transactions is provided between users including information services providers, formation of a flexible network market not depending on services based on a specific site can be expected.

The present invention is not limited to the above embodiment.

Figure 20:
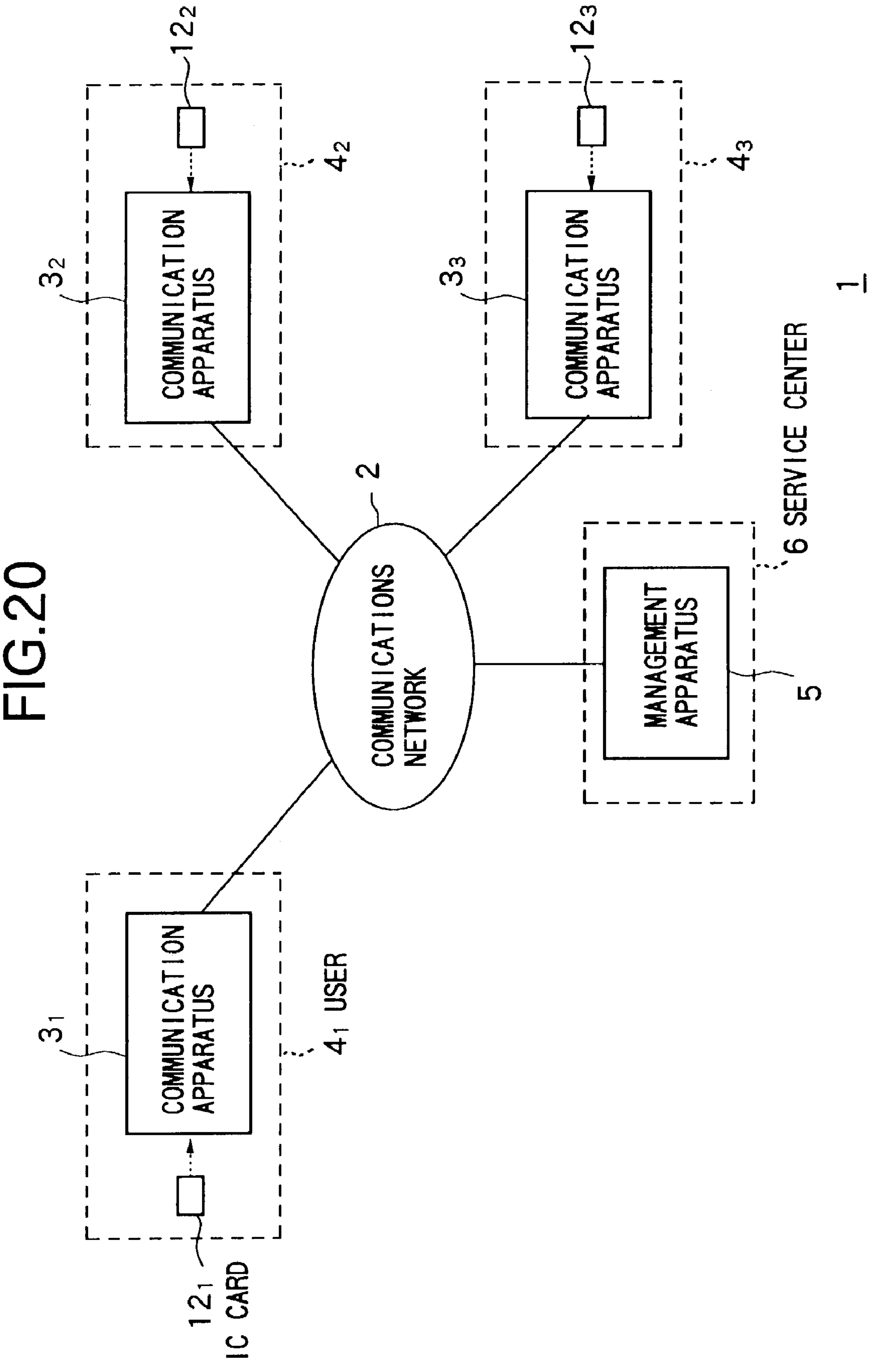
FIG. 20 is a view for explaining a case of storing a cyber passport information module in an IC of an IC card in a communication system of an embodiment of the present invention.
Figure 21:
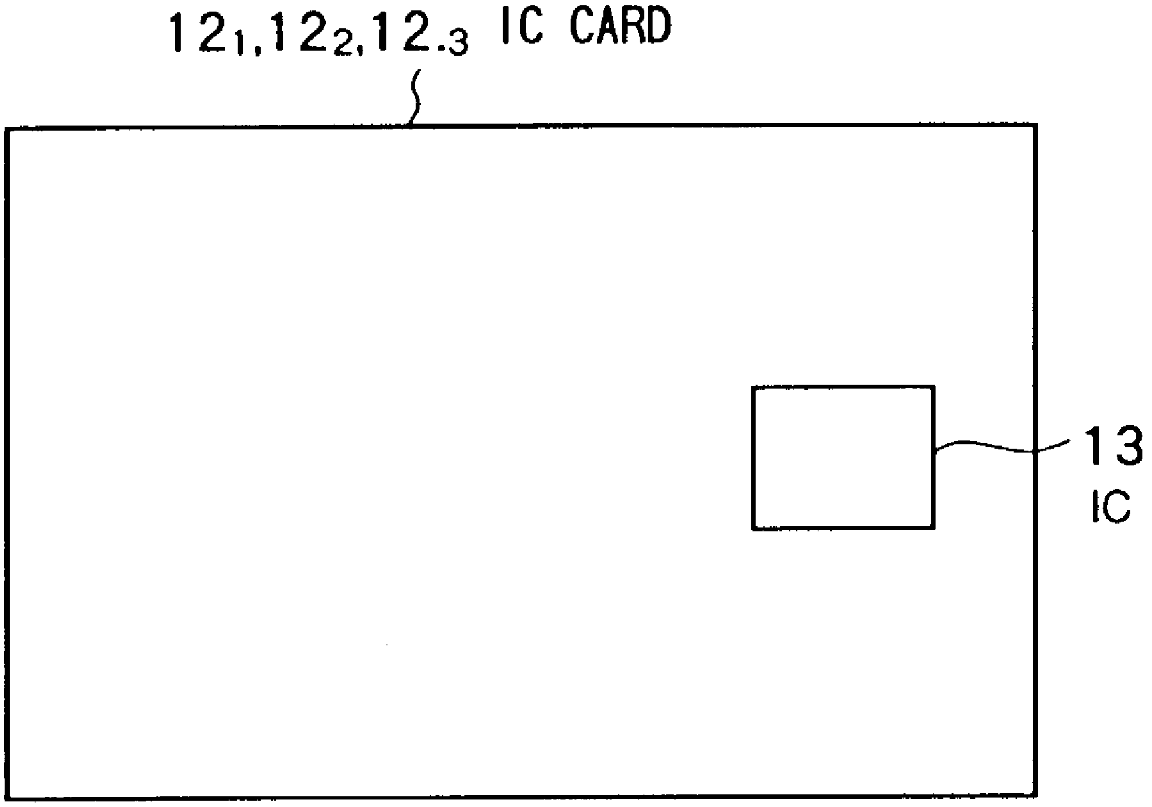
FIG. 21 is a view for explaining an IC card shown in FIG. 20.

In the above embodiment, a case was illustrated where the cyber passport information modules $SPIM_1$, $SPIM_2$, and $SPIM_3$ were stored in the communication apparatuses $3_1$, $3_2$, and $3_3$, but as shown in FIG. 20, the cyber passport information modules $SPIM_1$, $SPIM_2$, and $SPIM_3$ may also be stored in an IC (integrated circuit) 13 shown in FIG. 21 and the above processing performed while the communication apparatuses $3_1$, $3_2$, and $3_3$ access the IC 13. Also, the format of the cyber passport information modules SPIM is not limited to that indicated in FIG. 2.

Note that the IC 13 corresponds to the storage medium of the present invention.

Below, an example of a cyber passport information module SPIM written using XML will be explained for reference.

FIGS. 22 to 25 are views for explaining an example of writing a cyber passport information module SPIM by XML.

FIG. 22 is a description of a header information module 21 and a view information module 22 in a cyber passport information module SPIM.

FIG. 23 is description of a property information module 23 in a cyber passport information module SPIM.

FIGS. 24 and 25 are descriptions of an association information module 24 in a cyber passport information module SPIM.

INDUSTRIAL APPLICABILITY

As explained above, according to the present invention, it is possible to provide a communication method enabling a management apparatus to obtain a grasp of the behavior of users on a communications network even when communication apparatuses of users communicate via a communications network without going through the management apparatus and a communication system, communication apparatus, management apparatus, and storage medium for the same.

| LIST OF REFERENCE NUMERALS |
| --- |
| 1 . . . comm system |
| 2 . . . comm network |
| 31, 32, 33 . . . comm apparatus |
| 41, 42, 43 . . . user |
| 121, 122, 123 . . . IC card |
| SPIM . . . cyber passport information module |
| 30 . . . comm interface unit |
| 31 . . . operation unit |
| 32 . . . display unit |
| 33 . . . user information module storage unit |
| 34 . . . storage unit |
| 35 . . . processing unit |
| 50 . . . comm interface unit |
| 51 . . . operation unit |
| 52 . . . display unit |
| 53 . . . storage unit |
| 54 . . . processing unit |

The invention claimed is:

1. A communication method wherein a plurality of communication apparatuses and a management apparatus communicate via a communications network, comprising the steps of:

holding by said communication apparatus a user information module including user attribute information, from which user trends can be derived, indicating an attribute of a user of the communication apparatus;

sending by said communication apparatus said user attribute information of the user of that communication apparatus to other of said communication apparatus, receiving and holding by said communication apparatus the user attribute information of a user of the other communication apparatus from the other communication apparatus; and sending by any of said communication apparatus said user attribute information of the user of said other communication apparatus to said management apparatus.

2. The communication method as set forth in claim 1, wherein said user attribute information contains at least identification information of said user information module of a corresponding user.

3. The communication method as set forth in claim 1, wherein any of said communication apparatus stores said user attribute information received from said other communication apparatus in said user information module of the user of the communication apparatus.

4. The communication method as set forth in claim 1, wherein said management apparatus obtains an attribute of communication performed via said communications network based on said user attribute information received from any of said communication apparatus.

5. The communication method as set forth in claim 4, wherein the attribute of communication is the contents of a transaction performed between users of a plurality of communication apparatuses linked by communication via said communications network.

6. The communication method as set forth in claim 4, wherein the attribute of communication is a group formed by users of a plurality of said communication apparatuses linked by communication via said communications network.

7. The communication method as set forth in claim 4, wherein the management apparatus figures out a log of communications performed by said users through said communications line based on the attribute of communication.

8. The communication method as set forth in claim 3, wherein when the user of that any communication apparatus and the user of the other communication apparatus communicate concerning a transaction, any of said communication apparatus stores transaction contents information indicating the contents of the transaction in said user information module and sends said transaction contents information to said management apparatus.

9. The communication method as set forth in claim 8, wherein said management apparatus performs processing concerning settlement based on said transaction contents information.

10. The communication method as set forth in claim 1, wherein said user information module contains:

said user attribute information, user identification information, transaction contents information indicating the contents of a transaction by said communication performed with the other user, and said user attribute information of the user of the other communication apparatus communicated with.

11. The communication method as set forth in claim 2, wherein said user information module identification information is issued by said user or said management apparatus.

12. The communication method as set forth in claim 2, wherein said user attribute information further contains:

image information on said user and profile information of said user.

13. The communication method as set forth in claim 1, wherein at least a part of the information stored in said user information module is encoded by public key information of said management apparatus; and said management apparatus decodes said encoded information by using secret key information corresponding to said public key information.

14. The communication method as set forth in claim 3, wherein when a first user provides a service from a first communication apparatus to a second communication apparatus of a second user via said communications network, electronic money information or voucher information is transferred between said first communication apparatus and said second communication apparatus via said communications network to have said first user pay for said service to said second user.

15. The communication method as set forth in claim 14, wherein said first communication apparatus stores said user attribute information received from said second communication apparatus in said user information module of said first user.

16. A communication system where a plurality of communication apparatuses and a management apparatus communicate via a communications network, wherein said communication apparatus holds a user information module containing user attribute information, from which user trends can be derived, indicating an attribute of a user of the communication apparatus, any of said communication apparatus communicating with another communication apparatus sends said user attribute information of the user of the communication apparatus to said other communication apparatus and holds by receiving the user attribute information of the user of the other communication apparatus from the other communication apparatus, and any of said communication apparatus sends said held user attribute information of the user of said other communication apparatus to said management apparatus.

17. The communication system as set forth in claim 16, wherein said user attribute information contains at least identification information of said user information module of a corresponding user.

18. The communication system as set forth in claim 16, wherein said any communication apparatus stores said user attribute information received from said other communication apparatus in said user information module of the user of any of said communication apparatus.

19. The communication system as set forth in claim 16, wherein said management apparatus obtains an attribute of communication performed via said communications network based on said user attribute infonnation received from any of said communication apparatus.

20. The communication system as set forth in claim 19, wherein said communication attribute is content of a transaction performed between users of a plurality of communication apparatuses connected by communication via said communications network.

21. The communication system as set forth in claim 19, wherein said communication attribute is a group formed by users of a plurality of communication apparatuses connected by communication via said communications network.

22. A communication apparatus for communicating with other communication apparatuses and a management apparatus via a communications network comprising:

a storage means;

a communication interface; and a control means, wherein said storage means storing a user information module containing user attribute information, from which user trends can be derived, indicating an attribute of a user of the communication apparatus, said communication interface, when communicating with another communication apparatus, based on control from said control means, sending said user attribute information to said other communication apparatus and receiving said user attribute information of a user of the other communication apparatus from the other communication apparatus, said control means writing said received user attribute information in said storage means, and said communication interface sending said received user attribute information which said control means read from said storage means.

23. The communication apparatus as set forth in claim 22, wherein said user attribute information contains at least identification information of said user information module of the corresponding user.

24. The communication apparatus as set forth in claim 22, wherein any of said communication apparatus stores said user attribute information received from said other communication apparatus in said user information module of a user of any of the communication apparatus.

25. The communication apparatus as set forth in claim 22, wherein said user information module contains:

said user attribute information;

user identification information;

transaction content information indicating contents of a transaction by said communication performed with other users; and said user attribute information of a user of said other communication apparatus communicated with.

26. The communication apparatus as set forth in claim 23, wherein said user information module identification information is issued by said user or said management apparatus.

27. The communication apparatus as set forth in claim 23, wherein said user attribute information further contains:

image information on said user; and profile information of said user.

28. A management apparatus managing communication performed by a plurality of communication apparatuses through a communications network, comprising:

a communication interface for receiving, from a communication apparatus, user attribute information, from which user trends can be derived, indicating an attribute of a user of another communication apparatus obtained by said communication apparatus by communication between said communication apparatus and the other communication apparatus;

a storage means for storing said received user attribute information; and a processing means for managing an attribute of communication performed between said plurality of communication apparatuses based on the user attribute information stored in said storage means.

29. The management apparatus as set forth in claim 28, wherein said user attribute information contains at least identification information of said user information module of the corresponding user.

30. The management apparatus as set forth in claim 28, wherein said processing means manages contents of a transaction performed between users of a plurality of communication apparatuses connected by communication via said communications network.

31. The management apparatus as set forth in claim 28, wherein said processing means manages a group formed by users of a plurality of communication apparatuses connected by communication via said communications network.

32. The management apparatus as set forth in claim 28, wherein said processing means manages a log of communication which said user performed via said communications network by using said communication apparatus based on said communication attribute.

33. A storage medium storing a user information module used by a communication apparatus communicating with another communication apparatus via a communications network, wherein said user information module includes:

identification information for identifying the user information module;

attribute information, from which user trends can be derived, indicating an attribute of a user;

identification information for identifying a user;

transaction content information indicating contents of a transaction performed with a user of said other communication apparatus; and user attribute information of a user of said other communication apparatus communicated with.

34. The storage medium as set forth in claim 33, wherein said user attribute information includes:

image information on said user; and profile information of said user.

35. The storage medium as set forth in claim 33, wherein at least a part of information stored in said user information module is encoded by public key information of a manager of said user information module.

36. A user information module used by a communication apparatus communicating with another communication apparatus via a communications network which includes:

identification information for identifying the user information module, attribute information, from which user trends can be derived, indicating an attribute of a user, identification information for indicating a user, transaction content information indicating a content of a transaction performed with a user of said other communication apparatus, and said user attribute information of the user of said other communication apparatus communicated with.

37. The user information module as set forth in claim 36, wherein said user attribute information includes:

image information on said user; and profile information of said user.

38. The user information module as set forth in claim 36, wherein at least a part of information stored in said user information module is encoded by public key information of a manager of said user information module.

* * * * *